(12) United States Patent
Nam et al.

(10) Patent No.: US 8,743,791 B2
(45) Date of Patent: Jun. 3, 2014

(54) APPARATUS AND METHOD FOR UPLINK TRANSMISSION IN WIRELESS COMMUNICATION SYSTEMS

(71) Applicant: Samsung Electronics Co. Ltd., Suwon-si (KR)

(72) Inventors: Young-Han Nam, Richardson, TX (US); Boon Loong Ng, Richardson, TX (US); Jianzhong Zhang, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 65 days.

(21) Appl. No.: 13/623,575

(22) Filed: Sep. 20, 2012

(65) Prior Publication Data

US 2013/0077569 A1 Mar. 28, 2013

Related U.S. Application Data

(60) Provisional application No. 61/538,021, filed on Sep. 22, 2011, provisional application No. 61/539,388, filed on Sep. 26, 2011, provisional application No. 61/554,857, filed on Nov. 2, 2011, provisional application No. 61/666,541, filed on Jun. 29, 2012.

(51) Int. Cl.
*H04W 4/00* (2009.01)

(52) U.S. Cl.
USPC .......................................... 370/328; 370/329

(58) Field of Classification Search
USPC ......... 370/229, 230, 235, 328, 329, 310, 344, 370/342, 330, 389, 431; 455/456.1, 127.1, 455/522, 450
See application file for complete search history.

(56) References Cited

U.S. PATENT DOCUMENTS

| | | | |
|---|---|---|---|
| 2008/0247375 A1* | 10/2008 | Muharemovic et al. | 370/344 |
| 2010/0034152 A1* | 2/2010 | Imamura | 370/329 |
| 2010/0080154 A1* | 4/2010 | Noh et al. | 370/310 |
| 2010/0142455 A1* | 6/2010 | Imamura | 370/329 |
| 2011/0034175 A1* | 2/2011 | Fong et al. | 455/450 |
| 2011/0105059 A1* | 5/2011 | Gaal et al. | 455/127.1 |
| 2011/0199990 A1* | 8/2011 | Chang et al. | 370/329 |
| 2012/0320852 A1* | 12/2012 | Seo et al. | 370/329 |
| 2013/0003668 A1* | 1/2013 | Xiao et al. | 370/329 |
| 2013/0028229 A1* | 1/2013 | Suh et al. | 370/329 |
| 2013/0039332 A1* | 2/2013 | Nazar et al. | 370/330 |
| 2013/0070703 A1* | 3/2013 | Yasukawa et al. | 370/329 |
| 2013/0287064 A1* | 10/2013 | Seo et al. | 375/144 |

FOREIGN PATENT DOCUMENTS

WO 2011-017515 A2 2/2011

* cited by examiner

*Primary Examiner* — Abdullah Riyami
(74) *Attorney, Agent, or Firm* — Jefferson IP Law, LLP

(57) ABSTRACT

An apparatus and method for a User Equipment in a wireless network including at least one Base Station (BS) are provided. The method includes receiving an Information Element (IE) for configuring at least one of a PUSCH power control method and a PUSCH DMRS generation method from the BS, determining a state of the IE, and transmitting a PUSCH and a DMRS for the PUSCH according to the state of the IE. A transmission power of the PUSCH is controlled and a base sequence for the PUSCH DMRS is generated according to the state of the IE. When the state of the IE indicates a first state, the transmission power of the PUSCH is determined according to a first power control equation. When the state of the IE indicates a second state, the transmission power of the PUSCH is determined according to a second power control equation.

21 Claims, 8 Drawing Sheets

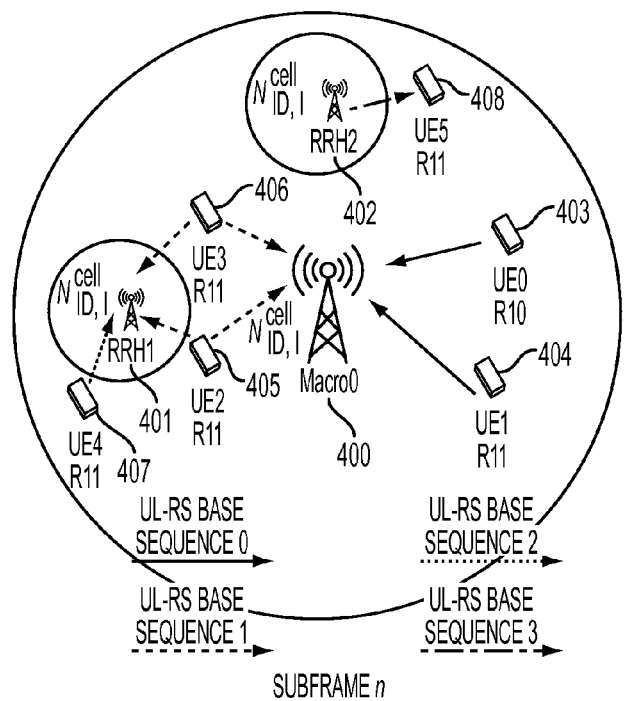
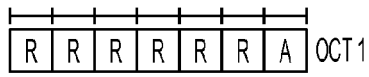
FIG. 4
FIG. 5A          FIG. 5B

APPARATUS AND METHOD FOR UPLINK TRANSMISSION IN WIRELESS COMMUNICATION SYSTEMS

CROSS-REFERENCE TO RELATED APPLICATIONS

This application claims the benefit under 35 U.S.C. §119 (e) of a U.S. Provisional application filed on Sep. 22, 2011 in the U.S. Patent and Trademark Office and assigned Ser. No. 61/538,021, a U.S. Provisional application filed on Sep. 26, 2011 in the U.S. Patent and Trademark Office and assigned Ser. No. 61/539,388, a U.S. Provisional application filed on Nov. 2, 2011 in the U.S. Patent and Trademark Office and assigned Ser. No. 61/554,857, and a U.S. Provisional application filed on Jun. 29, 2012 in the U.S. Patent and Trademark Office and assigned Ser. No. 61/666,541, the entire disclosure of each of which is hereby incorporated by reference.

BACKGROUND OF THE INVENTION

1. Field of the Invention

The present invention relates to an apparatus and method for uplink transmission in wireless communication systems. More particularly, the present invention relates to an apparatus and method for providing Coordinated Multi-Point (COMP) transmission and reception for uplink transmissions in a wireless communication system.

2. Description of the Related Art

Mobile terminals provide wireless communication between users and while becoming increasingly popular, mobile terminals offer a growing number of data and telecommunication services to users. Accordingly, mobile terminals now provide many additional features beyond simple telephone conversation, such as an alarm function, a Short Messaging Service (SMS), a Multimedia Message Service (MMS), E-mail, games, remote control of short range communication, an image capturing function using a mounted digital camera, a multimedia function for providing and/or viewing audio and video content, a scheduling function, and many other similar functions. Thus, the increased use of mobile terminals and the greater number of bandwidth consuming functions provided by mobile terminals has resulted in greater demand for bandwidth in wireless communication systems.

Long Term Evolution (LTE) and LTE-Advanced (LTE-A) wireless communication systems have been identified and deployed in order to provide increased bandwidth in wireless communication systems. In LTE and LTE-A systems, there are two types of UpLink (UL) Reference Signals (RSs), namely Demodulation RSs (DMRSs) and Sounding RSs (SRSs). For a Physical Uplink Shared Channel (PUSCH) transmission, DMRSs are transmitted via two Single Carrier-Frequency Division Modulation (SC-FDM) symbols, wherein one SC-FDM symbol is disposed in each of the two time slots of a subframe. SRSs are transmitted via one SC-FDM symbol that is disposed in the second time slot in a subframe. A method of generating a UL RS sequence, which may be a cell-specific UL RS base sequence, for a mobile terminal (or User Equipment (UE)) compatible with the LTE Release-10 (Rel-10) specification is described below.

To generate a UL RS sequence, a UE may first generate a base UL RS sequence, which is a Constant Amplitude Zero Auto-Correlation (CAZAC) sequence. The UE then applies Cyclic Shifts (CSs) to the base UL RS sequence, where the CSs are a value from 0 to 11. For the LTE specification up to the Rel-10 specification, the base UL RS sequence is a cell-specific RS sequence that is a function of a physical cell-id. In general, the CS and the base UL RS sequence are assigned to UEs so as to maintain small inter-user interference, or to make UL RS sequences of the UEs orthogonal or quasi-orthogonal to each other. Multiple UL RS sequences are orthogonal to each other when they are generated from the same base UL RS sequence and respectively have different CSs. Multiple UL RS sequences are quasi-orthogonal, i.e., the UL RSs have a relatively small cross-correlation, when they are generated from different UL RS sequences, regardless of whether their respective CSs are different.

In a case where multiple UEs in a same cell are multiplexed within a same UL bandwidth, which may result in intra-cell interference, an inter-user interference power level may be relatively high. Accordingly, in order to mitigate the inter-user interference in such a case, a base station may orthogonalize the UL RS sequences. Or in other words, the base station may assign different CSs to respective UEs within the same UL bandwidth. In a case where multiple subscriber stations in different cells are multiplexed within a same UL BW, which may result in inter-cell interference, the inter-user interference power level may be relatively low. However in order to make sure that the interference does not coherently add up with the desired signal, different base sequences may be assigned to respective UEs.

The LTE specification includes 30 base UL RS sequence groups, wherein each group is indexed by u=0, 1 ... 28, 29. Within a group, in a case where the RS sequence length is greater than or equal to 6 Resource Blocks (RBs) or greater than or equal to 84 subcarriers, then there are two base RS sequences indexed by v=0, 1 for the group. In a case where the RS sequence length is less than 6 RBs, then there is only one base sequence for the group. As noted above, a base UL RS sequence is a CAZAC sequence. However, it is generated differently depending on the length of the base UL RS sequence.

For example, for base sequences for 1 or 2 RBs, or 12 or 24 subcarriers, base RS sequences are computer generated CAZAC sequences. For base sequences for more than 2 RBs, or more than 24 subcarriers, base RS sequences are Zadoff-Chu (ZC) sequences. A ZC sequence generation is described in Equation 1, below, wherein a number of subcarriers in a Physical RB (PRB) is $N_{sc}^{RB}=12$, and the length of a base sequence is denoted by $M_{sc}^{RS}$. For base sequences having a length greater than or equal to $3N_{sc}^{RB}$, such that $M_{sc}^{RS} \geq 3/N_{sc}^{RB}$, the base sequence $\bar{r}_{u,v}(0), \ldots, \bar{r}_{u,v}(M_{sc}^{RS}-1)$ is given by:

$$\bar{r}_{u,v}(n)=x_q(n \bmod N_{ZC}^{RS}), 0 \leq n < M_{sc}^{RS},  \quad \text{[Equation 1]}$$

wherein the $q^{th}$ root Zadoff-Chu sequence is defined by:

$$x_q(m) = e^{-j\frac{\pi q m(m+1)}{N_{ZC}^{RS}}}, 0 \leq m \leq N_{ZC}^{RS} - 1,$$

wherein q is given by:

$$q=\lfloor \bar{q}+\frac{1}{2} \rfloor + v \cdot (-1)^{\lfloor 2\bar{q} \rfloor},$$

$$\bar{q}=N_{sc}^{RS} \cdot (u+1)/31$$

and the length $N_{ZC}^{RS}$ of the Zadoff-Chu sequence is given by the largest prime number such that $N_{ZC}^{RS} < M_{sc}^{RS}$.

In order to further reduce the inter-cell interference, LTE systems may use Sequence Hopping and Group Hopping, wherein a base sequence group index u of a UL RS may change with respect to time slots. For Group Hopping, a sequence-group number u in slot $n_s$ is calculated according to Equation 2, below.

$$u=(f_{gh}(n_s)+f_{ss}) \bmod 30,  \quad \text{[Equation 2]}$$

wherein, $f_{gh}(n_s)$ is a group hopping pattern, and $f_{ss}$ is a sequence hopping pattern. In LTE systems, there are 17 different group hopping patterns and 30 different sequence-shift patterns that may be used in Equation 2. Sequence-group hopping may be enabled or disabled, and a Physical Uplink Control Channel (PUCCH) and a PUSCH may have the same group hopping pattern but may have different sequence hopping patterns. A group hopping pattern, $f_{gh}(n_s)$, is given by Equation 3, below.

$$f_{gh}(n_s) = \begin{cases} 0 & \text{if group hopping is disabled} \\ \left(\sum_{i=0}^{7} c(8n_s+i) \cdot 2^i\right) \bmod 30 & \text{if group hopping is enabled,} \end{cases} \quad \text{[Equation 3]}$$

wherein c(i) is a pseudo-random sequence, and the corresponding pseudo-random sequence generator may be initialized with $$c_{init} = \left\lfloor \frac{N_{ID}^{cell}}{30} \right\rfloor$$

at a beginning of each radio frame. For the PUCCH, the sequence-shift pattern $f_{ss}^{PUCCH}$ is given by Equation 4, below.

$$f_{ss}^{PUCCH}=N_{ID}^{cell} \bmod 30 \quad \text{[Equation 4]}$$

For the PUSCH, the sequence-shift pattern $f_{ss}^{PUCCH}$ is given by Equation 5, below.

$$f_{ss}^{PUCCH}=(f_{ss}^{PUCCH}+\Delta_{ss}) \bmod 30, \quad \text{[Equation 5]}$$

wherein $\Delta_{ss} \in \{0, 1, \ldots, 29\}$.

Sequence hopping may be applied to reference-signals having a length of $M_{sc}^{RS} \geq 6 N_{sc}^{RB}$. For reference-signals having a length of $M_{sc}^{RS} < 6 N_{sc}^{RB}$, the base sequence number v within the base sequence group is given by v=0. For reference-signals of length $M_{sc}^{RS} \geq 6 N_{sc}^{RB}$, the base sequence number v within the base sequence group in slot $n_s$ is given by Equation 6, below.

$$v = \begin{cases} c(n_s) & \text{if group hopping is disabled and sequence hopping is enabled} \\ 0 & \text{otherwise,} \end{cases} \quad \text{[Equation 6]}$$

wherein, c(i) is a pseudo-random sequence, and the corresponding pseudo-random sequence generator shall be initialized with $$c_{init} = \left\lfloor \frac{N_{ID}^{cell}}{30} \right\rfloor \cdot 2^5 + f_{ss}^{PUSCH}$$

at the beginning of each radio frame. Sequence hopping may be enabled according to a designer's or user's choice, and sequence hopping for the PUSCH may be disabled for any certain UE despite being enabled for a cell.

It is noted that $\Delta_{ss} \in \{0, 1, \ldots, 29\}$ is a cell-specific parameter that is configured by a Radio Resource Control (RRC) layer and is used for orthogonalizing PUSCHs from different cells. In a case where there are two cells with two different cell IDs, $N_{ID,1}^{cell}$ and $N_{ID,2}^{cell}$. Then the two respective PUCCH shift patterns are $f_{ss,1}^{PUCCH}=N_{ID,1}^{cell} \bmod 30$ and $f_{ss,2}^{PUCCH}=N_{ID,2}^{cell} \bmod 30$, and in most cases they are different such that $f_{ss,1}^{PUCCH} \neq f_{ss,2}^{PUCCH}$. Accordingly, the two PUCCH signals are quasi-orthogonal. However, in a case where $\Delta_{ss,1}$ and $\Delta_{ss,2}$ are set in a manner such that $f_{ss,1}^{PUSCH}=(f_{ss,1}^{PUCCH}+\Delta_{ss,1}) \bmod 30 = (f_{ss,2}^{PUCCH}+\Delta_{ss,2}) \bmod 30 = f_{ss,2}^{PUSCH}=f_{ss,2}^{PUSCH}$ and the two PUSCH signals are orthogonal to each other. Furthermore, the UL RS base sequences may be used to generate physical signals for two different format types of the PUCCH, those being PUCCH format 1, which also includes formats 1a and 1b, and PUCCH format 2, which also includes formats 2a and 2b. A resource used for transmission of PUCCH format 1/1a/1b (for scheduling request or HARQ-ACK) is represented by a non-negative index $n_{PUCCH}^{(1)}$.

FIG. 1 is a diagram illustrating a PUCCH resource partition in one pair of PRBs in a UL carrier in an LTE system according to the related art.

Referring to FIG. 1, a PUCCH resource index $n_{PUCCH}^{(1)}$ determines an Orthogonal Cover Code (OCC) and a CS, which are used in combination to indicate a unique resource. As shown in FIG. 1, in one pair of PRBs, there are 36 PUCCHs resources available, wherein the OCC value is 3 and the CS value is 12.

Resources used for transmission of PUCCH format 1, 1a and 1b are identified by a resource index $n_{PUCCH}^{(1)}$ from which the orthogonal sequence index $n_{oc}(n_s)$ and the cyclic shift $\alpha(n_s,l)$ are determined according to Equation 7, given below.

$$n_{oc}(n_s) = \begin{cases} \lfloor n'(n_s) \cdot \Delta_{shift}^{PUCCH} / N' \rfloor & \text{for normal cyclic prefix} \\ 2 \cdot \lfloor n'(n_s) \cdot \Delta_{shift}^{PUCCH} / N' \rfloor & \text{for extended cyclic prefix} \end{cases} \quad \text{[Equation 7]}$$

$$\alpha(n_s, l) = 2\pi \cdot n_{cs}(n_s, l) / N_{sc}^{RB}$$

$$n_{cs}(n_s, l) =$$

$$\begin{cases} \left[ n_{cs}^{cell}(n_s, l) + \left( \begin{array}{c} n'(n_s) \cdot \Delta_{shift}^{PUCCH} + \delta_{offset}^{PUCCH} + \\ (n_{oc}(n_s) \bmod \Delta_{shift}^{PUCCH}) \end{array} \right) \bmod N' \right] \bmod N_{sc}^{RB} & \text{for normal cyclic prefix} \\ \left[ n_{cs}^{cell}(n_s, l) + \left( \begin{array}{c} n'(n_s) \cdot \Delta_{shift}^{PUCCH} + \delta_{offset}^{PUCCH} + \\ n_{oc}(n_s)/2 \end{array} \right) \bmod N' \right] \bmod N_{sc}^{RB} & \text{for extended cyclic prefix,} \end{cases}$$

wherein N' and c are determined according to Equation 8, given below.

$$N' = \begin{cases} N_{cs}^{(1)} & \text{if } n_{PUCCH}^{(1)} < c \cdot N_{cs}^{(1)}/\Delta_{shift}^{PUCCH} \\ N_{sc}^{RB} & \text{otherwise} \end{cases}$$ [Equation 8]

$$c = \begin{cases} 3 & \text{normal cyclic prefix} \\ 2 & \text{extended cyclic prefix} \end{cases}$$

In a case where $n_s \bmod 2=0$, the resource indices within the two resource blocks in the two slots of a subframe to which the PUCCH is mapped are determined by Equation 9, given below.

$$n'(n_s) = \begin{cases} n_{PUCCH}^{(1)} & \text{if } n_{PUCCH}^{(1)} < c \cdot N_{cs}^{(1)}/\Delta_{shift}^{PUCCH} \\ (n_{PUCCH}^{(1)} - c \cdot N_{cs}^{(1)}/\Delta_{shift}^{PUCCH}) \bmod (c \cdot N_{sc}^{RB}/\Delta_{shift}^{PUCCH}) & \text{otherwise} \end{cases}$$ [Equation 9]

In a case where $n_s \bmod 2=1$, the resource indices within the two resource blocks in the two slots of a subframe to which the PUCCH is mapped are determined by Equation 10, given below.

$$n'(n_s) = \begin{cases} [c(n'(n_s-1)+1)] \bmod (cN_{sc}^{RB}/\Delta_{shift}^{PUCCH}+1)-1 & n_{PUCCH}^{(1)} \geq c \cdot N_{cs}^{(1)}/\Delta_{shift}^{PUCCH} \\ \lfloor h/c \rfloor + (h \bmod c)N'/\Delta_{shift}^{PUCCH} & \text{otherwise,} \end{cases}$$ [Equation 10]

wherein $h=(n'(n_s-1)+d) \bmod (cN'/\Delta_{shift}^{PUCCH})$ with d=2 for a normal Cyclic Prefix (CP) and d=0 for an extended CP. The quantities $\Delta_{shift}^{PUCCH}$ and $\delta_{offset}^{PUCCH}$ may be set by higher layers. Furthermore, PUCCH 1a carries one-bit information using BPSK (+1,−1) modulation, while PUCCH 1b carries two-bit information using QPSK (+1,−1,+j,−j) modulation, where $j=\sqrt{\sqrt{-1}}$.

Resources used for transmission of PUCCH formats 2, 2a, and 2b are identified by a resource index $n_{PUCCH}^{(2,\tilde{p})}$ from which the cyclic shift $\alpha_{\tilde{p}}(n_s,l)$ is determined according to Equation 11, given below.

$$\alpha_{\tilde{p}}(n_s,l) = 2\pi \cdot n_{cs}^{(\tilde{p})}(n_s,l)/N_{sc}^{RB},$$

$$n_{cs}^{(\tilde{p})}(n_s,l) = (n_{cs}^{cell}(n_s,l)+\tilde{n}_{\tilde{p}}(n_s)) \bmod N_{sc}^{RB},$$ [Equation 11]

wherein, for $n_s \bmod 2=0$, $$n'_{\tilde{p}}(n_s) = \begin{cases} n_{PUCCH}^{(2,\tilde{p})} \bmod N_{sc}^{RB} & \text{if } n_{PUCCH}^{(2,\tilde{p})} < N_{sc}^{RB} N_{RB}^{(2)} \\ (n_{PUCCH}^{(2,\tilde{p})} + N_{cs}^{(1)}+1) \bmod N_{sc}^{RB} & \text{otherwise,} \end{cases}$$

and for $n_s \bmod 2=1$, $$n'_{\tilde{p}}(n_s) = \begin{cases} [N_{sc}^{RB}(n'_{\tilde{p}}(n_s-1)+1)] \bmod (N_{sc}^{RB}+1)-1 & \text{if } n_{PUCCH}^{(2,\tilde{p})} < N_{sc}^{RB} N_{RB}^{(2)} \\ (N_{sc}^{RB} - 2 - n_{PUCCH}^{(2,\tilde{p})}) \bmod N_{sc}^{RB} & \text{otherwise.} \end{cases}$$

For PUCCH formats 2a and 2b, which are supported for a normal cyclic prefix only, the bits $b(20), \ldots, b(M_{bit}-1)$ may be modulated as described below in Table 1 resulting in a single modulation symbol d(10) used in the generation of the reference-signal for PUCCH format 2a and 2b.

TABLE 1

| PUCCH format | $b(20), \ldots, b(M_{bit}-1)$ | d(10) |
|---|---|---|
| 2a | 0 | 1 |
|  | 1 | −1 |
| 2b | 00 | 1 |
|  | 01 | −j |
|  | 10 | j |
|  | 11 | −1 |

FIG. 2 illustrates UL sub-cell splitting according to the related art.

Referring to FIG. 2, with respect to CoMP operations or functionality in an LTE system, one of the deployment scenarios for CoMP operations may be referred to as CoMP Scenario 4. CoMP Scenario 4 may be case wherein a network has low power Remote Radio Heads (RRHs) within a macrocell coverage area, wherein the transmission and/or reception points created by the RRHs have the same cell Identifiers (IDs) as the macrocell. In such a case, the Cell-Specific Reference Signals (CRSs) may be transmitted by all Transmission Points (TPs), however each TP transmits its own Channel State Information (CSI)-RS, which is a TP specific CSI-RS. For DownLink (DL) data transmission, a UE may receive the downlink data from the TP or a set of TPs having the best DL signal quality. Due to the spatial isolation of the TPs, DL resources in TPs that are sufficiently isolated from one another may be reused in order to obtain a sub-cell splitting gain.

The CSI-RS may be defined according to the following description, and a CSI-RS-Config Information Element (IE) may be used to specify the CSI-RS configuration. The CSI-RS-Config IE is shown below in Table 2, and the fields of the CSI-RS-Config IE are defined according to Table 3, shown below.

TABLE 2

```
- - ASN1START
CSI-RS-Config-r10 ::=        SEQUENCE {
  csi-RS-r10                 CHOICE {
    release                  NULL,
    setup                    SEQUENCE {
      antennaPortsCount-r10      ENUMERATED {an1, an2, an4, an8},
      resourceConfig-r10         INTEGER (0..31),
      subframeConfig-r10         INTEGER (0..154),
      p-c-r10                    INTEGER (-8..15)
    }
  }                                                    OPTIONAL,   - - Need ON
  zeroTxPowerCSI-RS-r10      CHOICE {
    release                  NULL,
    setup                    SEQUENCE {
      zeroTxPowerResourceConfigList-r10   BIT STRING (SIZE (16)),
      zeroTxPowerSubframeConfig-r10       INTEGER (0..154)
    }
  }                                                    OPTIONAL    - - Need ON
}
-- ASN1STOP
```

TABLE 3

| CSI-RS-Config field descriptions |
| --- |
| antennaPortsCount |
| Parameter represents the number of antenna ports used for transmission of CSI reference signals where an1 corresponds to 1, an2 to 2 antenna ports etc. see TS 36.211 [21, 6.10.5]. |
| p-C |
| Parameter: $P_c$, see TS 36.213 [23, 7.2.5]. |
| resourceConfig |
| Parameter: CSI reference signal configuration, see TS 36.211 [21, table 6.10.5.2-1 and 6.10.5.2-2]. |
| subframeConfig |
| Parameter: $I_{CSI\text{-}RS}$, see TS 36.211 [21, table 6.10.5.3-1]. |
| zeroTxPowerResourceConfigList |
| Parameter: ZeroPowerCSI-RS, see TS 36.211 [21, 6.10.5.2]. |
| zeroTxPowerSubframeConfig |
| Parameter: $I_{CSI\text{-}RS}$, see TS 36.211 [21, table 6.10.5.3-1]. |

Furthermore, as CSI-RS may be mapped to resource elements according to the following description. In subframes configured for CSI-RS transmission, a reference signal sequence $r_{l,n_s}(m)$ may be mapped to complex-valued modulation symbols $a_{k,l}^{(p)}$, which are used as reference symbols on antenna port p according to Equation 12, given below.

$$a_{k,l}^{(p)} = w_{l''} \cdot r_{l,n_s}(m'),$$ [Equation 12]

wherein $$k = k' + 12m + \begin{cases} -0 & \text{for } p \in \{15, 16\}, \text{ normal cyclic prefix} \\ -6 & \text{for } p \in \{17, 18\}, \text{ normal cyclic prefix} \\ -1 & \text{for } p \in \{19, 20\}, \text{ normal cyclic prefix} \\ -7 & \text{for } p \in \{21, 22\}, \text{ normal cyclic prefix} \\ -0 & \text{for } p \in \{15, 16\}, \text{ extended cyclic prefix} \\ -3 & \text{for } p \in \{17, 18\}, \text{ extended cyclic prefix} \\ -6 & \text{for } p \in \{19, 20\}, \text{ extended cyclic prefix} \\ -9 & \text{for } p \in \{21, 22\}, \text{ extended cyclic prefix} \end{cases}$$

$$l = l' + \begin{cases} l'' & \text{CSI reference signal configurations } 0-19, \text{ normal cyclic prefix} \\ 2l'' & \text{CSI reference signal configurations } 20-31, \text{ normal cyclic prefix} \\ l'' & \text{CSI reference signal configurations } 0-27, \text{ extended cyclic prefix} \end{cases}$$

$$w_{l''} = \begin{cases} 1 & p \in \{15, 17, 19, 21\} \\ (-1)^{l''} & p \in \{16, 18, 20, 22\} \end{cases}$$

$$l'' = 0, 1$$

$$m = 0, 1, \ldots, N_{RB}^{DL} - 1$$

$$m' = m + \left\lfloor \frac{N_{RB}^{max,DL} - N_{RB}^{DL}}{2} \right\rfloor$$

A quantity (k',l') and the necessary conditions on $n_s$ for normal cyclic prefix are shown below in Table 4.

TABLE 4

| CSI reference signal Configuration (resource Config) | Number of CSI reference signals configured | | | | | |
| --- | --- | --- | --- | --- | --- | --- |
| | 1 or 2 (k',l') | $n_s$ mod 2 | 4 (k',l') | $n_s$ mod 2 | 8 (k',l') | $n_s$ mod 2 |
| Frame structure type 1 and 2 — 0 | (9, 5) | 0 | (9, 5) | 0 | (9, 5) | 0 |
| 1 | (11, 2) | 1 | (11, 2) | 1 | (11, 2) | 1 |
| 2 | (9, 2) | 1 | (9, 2) | 1 | (9, 2) | 1 |
| 3 | (7, 2) | 1 | (7, 2) | 1 | (7, 2) | 1 |
| 4 | (9, 5) | 1 | (9, 5) | 1 | (9, 5) | 1 |
| 5 | (8, 5) | 0 | (8, 5) | 0 | | |
| 6 | (10, 2) | 1 | (10, 2) | 1 | | |
| 7 | (8, 2) | 1 | (8, 2) | 1 | | |
| 8 | (6, 2) | 1 | (6, 2) | 1 | | |
| 9 | (8, 5) | 1 | (8, 5) | 1 | | |
| 10 | (3, 5) | 0 | | | | |
| 11 | (2, 5) | 0 | | | | |
| 12 | (5, 2) | 1 | | | | |
| 13 | (4, 2) | 1 | | | | |
| 14 | (3, 2) | 1 | | | | |

TABLE 4-continued

| | CSI reference signal Configuration (resource Config) | Number of CSI reference signals configured | | | | | |
|---|---|---|---|---|---|---|---|
| | | 1 or 2 (k',l') | $n_s$ mod 2 | 4 (k',l') | $n_s$ mod 2 | 8 (k',l') | $n_s$ mod 2 |
| | 15 | (2, 2) | 1 | | | | |
| | 16 | (1, 2) | 1 | | | | |
| | 17 | (0, 2) | 1 | | | | |
| | 18 | (3, 5) | 1 | | | | |
| | 19 | (2, 5) | 1 | | | | |
| Frame | 20 | (11, 1) | 1 | (11, 1) | 1 | (11, 1) | 1 |
| structure | 21 | (9, 1) | 1 | (9, 1) | 1 | (9, 1) | 1 |
| type 2 | 22 | (7, 1) | 1 | (7, 1) | 1 | (7, 1) | 1 |
| only | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

A cell-specific subframe configuration period $T_{CSI-RS}$ and a cell-specific subframe offset $\Delta_{CSI-RS}$ for the occurrence of CSI-RSs are provided in Table 5, as shown below.

TABLE 5

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

A parameter $I_{CSI-RS}$ may be configured separately for CSI reference signals for which a UE shall assume non-zero and zero transmission power. Subframes containing CSI-RSs may satisfy Equation 13, shown below.

$$(10n_f + \lfloor n_s/2 \rfloor - \Delta_{CSI-RS}) \bmod T_{CSI-RS} = 0 \quad \text{[Equation 13]}$$

FIG. 3 is an Enhanced-Physical DL Control Channel (E-PDCCH) according to the related art.

Referring to FIG. 3, for LTE Release-11 (Rel-11), the E-PDCCH is being discussed for increasing DL control capacity within a cell and for mitigating inter-cell interference for DL control. E-PDCCHs may be disposed in a Physical DL Shared Channel (PDSCH) region as illustrated in FIG. 3, and the E-PDCCH may convey DL control signaling to LTE Rel-11 UEs that have been configured to receive the E-PDCCH.

A reuse technique used for the UL, is similar to the reuse technique used for the DL as described above with reference to FIG. 2. In the case of the UL, depending on a location of the UE in the cell, the UE may transmit signals to the TP or a set of TPs having the best uplink signal quality. Due to the spatial isolation of the TPs, uplink resources in TPs that are sufficiently isolated from one another may be reused in order to obtain sub-cell splitting gain. As shown in FIG. 2, if a UE is far from any of the RRHs, then the UE may use TP-common transmission in order to connect to the Macro-enhanced Node B (eNB), which may also be referred to as a base station, and the other RRH TPs in the cell. Meanwhile, if a UE is close to one or more RRHs, then the UE may use TP-specific transmission to communicate with the network. In FIG. 2, dashed lines indicate TP-common uplink transmissions that are received by both the Macro-eNB and the RRHs, whereas solid lines indicate TP-specific uplink transmissions that are received only by nearby TPs.

For both the DL and the UL, the TPs for TP-specific transmission may be determined according to two methods. In a first method, TPs are selected according to a measurement of a UE's UL signal via at least one of the SRS, the PUCCH, the PUSCH, and any other suitable UL signal. For example, TPs listen to the UE's UL signals and the network determines each UE's TPs for the TP-specific transmission based on the TPs' measurement of the UE's UL signals. According to another exemplary embodiment, that being the second method of determining TPs for the TP-specific transmission, TPs are selected according to a UE's measurement of the CSI-RS. For example, the UE measures the CSI-RS and reports measurements, such as a Reference Signal Receive Power (RSRP) or other similar signal measurements, to the network. Accordingly, the network decides each UE's TPs for the TP-specific transmission according to the UE's measurement reports.

Up to LTE Rel-10, CRSs are used for the Pathloss (PL) estimation. Since a set of CRSs is uniquely defined for a given cell, CRS-based PL estimation works well for cellular deployment scenarios wherein TPs of a given cell are centralized and uniform with respect to the TPs' transmission power and other capabilities. However, for a non-uniform scenario, such as a system that includes both Macro-eNBs and distributed RRHs within an area having a single cell-ID, wherein the CRSs are transmitted by all TPs in a Single Frequency Network (SFN) manner, CRS-based PL estimation measures an "averaged" version of the channel quality with respect to all of the TPs. Accordingly the CRS-based PL estimation may not be associated with a physical channel quality between the UE and any individual TP from among all the TPs.

In further detail, with reference to FIG. 2, in a Multi-Input Multi-Output (MIMO) system having distributed RRHs, there may be different PL estimates for each of UE1 to UE3. For example, in a case where the Macro-eNB transmits at 43 DBM and the RRH transmits at 23 dBM, PL estimates may be calculated in the following methods. According to a first method, for a CRS-based PL estimate, wherein all RRHs are turned off and thus, only the Macro-eNB is active, a RSRP=−80 dBm and a PL_1 estimate=43 dB+80 dB=123 dB. According to a second method, for a CRS-based PL estimate, wherein the CRSs are transmitted by all TPs in the SFN manner, a RSRP=−65 dBm (as averaged from all nodes) and a PL_2 estimate=43 dB+65 dB=108 dB. In contrast, for an actual PL to the RRH, using a correct reference power, a RSRP=−67 dBm for only the RRH, and the actual PL_3=23 dB+67 dB=90 dB.

As can be seen above, the PL_2 estimate of 108 dB is approximately 18 dB over the actual PL_3, that being 90 dB, which the UE experiences with the nearby RRH. In another words, for TP-specific transmissions that target the particular nearby RRH, by using the LTE Rel-10 UL PC equation and PL estimate, a UE will transmit at a power level 18 dB above that which is needed in order to reach the RRH. Furthermore, it is noted that the overestimation is primarily a result of the wrong assumption of reference RS power with the CRS, which may only be set as one single value for a cell in LTE Rel-10. Accordingly, there is a waste of UE power and an increase of network interference due to the higher power level transmission.

As discussed above, the RSRP may be a linear average of the power contributions (in Watts) of resource elements that carry cell-specific reference signals within the frequency bandwidth that is being measured. Cell-specific reference signals $R_0$ may be used to determine the RSRP. However, if the UE reliably detects that reference signal $R_1$ is available, then the RSRP may be determined according to $R_1$ and $R_0$. The reference point on the UE for determining the RSRP may be the antenna connector of the UE. However, if receiver diversity is being used by the UE, then the reported RSRP value may not be lower than a RSRP value of any individual branch used in the receiver diversity.

Accordingly, there is a need for an apparatus and method for providing a more efficient CoMP transmission and reception for uplink transmissions in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide to an apparatus and method for providing Coordinated Multi-Point (CoMP) transmission and reception for uplink transmissions in a wireless communication system.

In accordance with an aspect of the present invention, a method of a User Equipment (UE) in a wireless network including at least one Base Station (BS) is provided. The method includes receiving an Information Element (IE) for configuring at least one of a Physical Uplink Shared Channel (PUSCH) power control method and a PUSCH Demodulation Reference Signal (DMRS) generation method from the at least one BS, determining a state of the IE, and transmitting a PUSCH and a DMRS for the PUSCH according to the state of the IE, wherein a transmission power of the PUSCH is controlled according to the state of the IE, wherein, when the state of the IE indicates a first state, then the transmission power of the PUSCH is determined according to a first power control equation, wherein, when the state of the IE indicates a second state, then the transmission power of the PUSCH is determined according to a second power control equation, and wherein a base sequence for the PUSCH DMRS is generated according to the state of the IE.

In accordance with another aspect of the present invention, a User Equipment (UE) apparatus for communicating in a wireless network including at least one Base Station (BS) is provided. The apparatus includes a transceiver for receiving an Information Element (IE) for configuring at least one of a Physical Uplink Shared Channel (PUSCH) power control method and a PUSCH Demodulation Reference Signal (DMRS) generation method from the at least one BS, and for transmitting a PUSCH and a DMRS for the PUSCH according to a state of the IE, and a controller for determining the state of the IE, for determining a transmission power of the PUSCH according to the state of the IE, and for generating a base sequence for the PUSCH DMRS according to the state of the IE, wherein, when the state of the IE indicates a first state, then the controller determines the transmission power of the PUSCH according to a first power control equation, and wherein, when the state of the IE indicates a second state, then the controller determines the transmission power of the PUSCH according to a second power control equation.

In accordance with another aspect of the present invention, a Base Station (BS) apparatus for communicating in a wireless network including at least one User Equipment (UE) is provided. The apparatus includes a controller for generating an Information Element (IE) for configuring at least one of a Physical Uplink Shared Channel (PUSCH) power control method and a PUSCH Demodulation Reference Signal (DMRS) generation method of the at least one UE, and a transceiver for transmitting the IE to the UE, for receiving a PUSCH and a DMRS for the PUSCH according to a state of the IE from the UE, and for receiving a base sequence for the PUSCH DMRS according to the state of the IE, wherein, when the state of the IE indicates a first state, then the transceiver receives the transmission power of the PUSCH according to a first power control equation, and wherein, when the state of the IE indicates a second state, then the transceiver receives the transmission power of the PUSCH according to a second power control equation.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 4 illustrates UL transmissions according to an exemplary embodiment of the present invention;

FIGS. 5A and 5B illustrate a Media Access Control (MAC) Control Element (CE) according to exemplary embodiments of the present invention;

Throughout the drawings, it should be noted that like reference numbers are used to depict the same or similar elements, features, and structures.

DETAILED DESCRIPTION OF EXEMPLARY EMBODIMENTS

Figure 1:
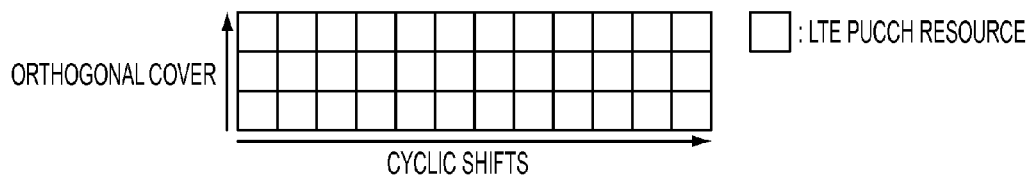
FIG. 1 is a diagram illustrating a Physical Uplink Control Channel (PUCCH) resource partition in one pair of Physical Resource Blocks (PRBs) in a UpLink (UL) carrier in a Long Term Evolution (LTE) system according to the related art.
Figure 2:
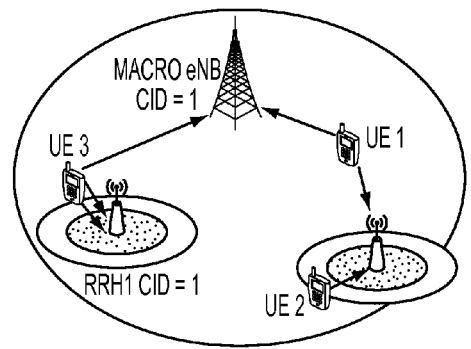
FIG. 2 illustrates UL sub-cell splitting according to the related art.
Figure 3:
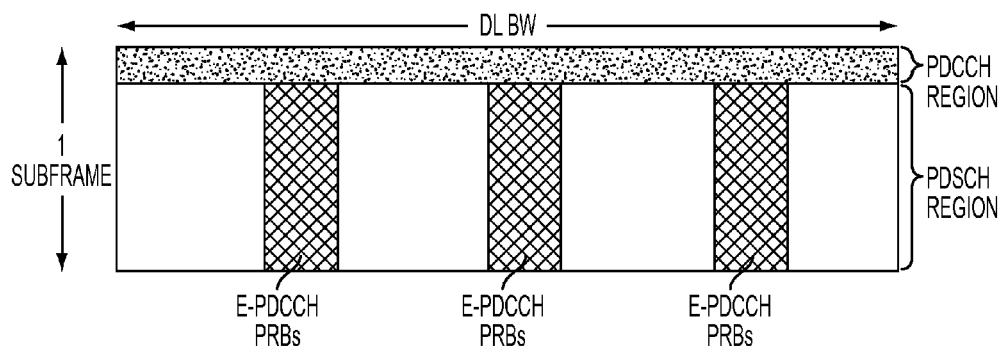
FIG. 3 is an Enhanced-Physical DownLink (DL) Control Channel (E-PDCCH) according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention include an apparatus and method for uplink transmission in wireless communication systems.

FIG. 4 illustrates UpLink (UL) transmissions according to an exemplary embodiment of the present invention.

Referring to FIG. 4, in a Long Term Evolution (LTE)-Advanced (LTE-A) Release-11 (Rel-11) system executing a Coordinated Multi-Point (CoMP) transmission and/or reception, a particular CoMP scenario may be commonly referred to as "CoMP scenario 4". The CoMP scenario 4 is a case where a central controller controls a number of Transmission Points (TPs), such as a Macro-enhanced NodeB (eNB) and Remote Radio Heads (RRHs) located in the Macro-eNB coverage area, and one physical cell Identifier (ID) is assigned to the Macro-eNB and RRHs, as shown in FIG. 4. According to the legacy LTE specifications, such as 3$^{rd}$ Generation Partnership Project (3GPP) LTE Release-10 (Rel-10), regardless of which TP receives UL data signals, a User Equipment (UE) generates UL-Reference Signal (RS) base sequences according to the physical cell ID, which is obtained during an initial access procedure of the UE into a cell, and parameters respectively configured for the cell into which the UE has entered.

Accordingly, if a Macro-eNB 400, a RRH 401 and a RRH 402 simultaneously receive signals in the same frequency band from different UEs 403 to 408, as illustrated in FIG. 4, interference from other TPs received at each of the UEs 403 to 408 may coherently add to a respective desired signal of each of the UEs 403 to 408, and the desired signal may be indistinguishable from the interfering signals. Thus, according to an exemplary embodiment of the present invention, a UE-specific or TP-specific UL RS base sequence may be generated for Rel-11 UEs in order to mitigate coherently added signals.

At the same time, in order to facilitate Multi-User (MU)-Multi-Input Multi-Output (MIMO) UE paring of Rel-11, Release-10 (Rel-10), and Release-9 (Rel-9) UEs, a legacy UE-RS scrambling may be used for Rel-11 UEs as well. The UE-RS scrambling may be enabled for Rel-11 UEs according to two methods. First, a UL RS base sequence generation method may be dynamically indicated in a DownLink (DL) and/or UL grant DL Control Information (DCI) format. Specifically, a UL RS base sequence generation method may be dynamically allocated from among at least two of UE-specific, TP-specific and Rel-10 compatible UL RS base sequences. Second, a UL RS base sequence generation method may be semi-static indicated in a DL and/or UL grant DCI format. Specifically, a UL RS base sequence generation method may be semi-statically indicated (e.g., via Radio Resource Control (RRC) signaling) from at least two of UE-specific, TP-specific and Rel-10 compatible UE-RS scrambling.

Referring to FIG. 4, exemplary uplink transmissions in subframes n and n+1 in a heterogeneous network are illustrated. As shown in FIG. 4, UE 403 is a Rel-10 UE, while all the other UEs 404-408 are Rel-11 UEs. In the network illustrated in FIG. 4, the following transmissions are happening in subframe n. The network schedules the same Physical Resource Blocks (PRBs) for UE 407 and UE 408, which are positioned far-away from each other such that UE 407 is positioned close to RRH 401 and UE 408 is positioned close to RRH 402. The same PRBs that are scheduled for UEs 407 and 408 are in subframe n using an appropriate power control mechanism, such as UE-specific or TP-specific power control. Furthermore, two UL RS from RRH 401 and RRH 402 are not coherently combined at the respective receivers, i.e., respective UEs, because different UL RS base sequences are allocated to the respective UEs. Thus, the network performs MU-MIMO multiplexing and assigns an orthogonal UL RS for the Rel-11 UE 404 and the Rel-10 UE 403, without affecting a demodulation performance of the Rel-10 UE 403. Furthermore, the network performs MU-MIMO multiplexing and assigns orthogonal UL RSs for two Rel-11 UEs, those being UE 405 and UE 406.

On the other hand, in subframe n+1, UE 404 and UE 405 do not transmit signals, for any reason such as having completed data transmission, being turned off or any other similar situation or condition. Due to the change in the number of UEs for the network, the following transmissions are happening in subframe n+1. The network schedules the same PRBs for UE 407 and UE 408, wherein UE 407 is positioned close to RRH 401 and UE 408 is positioned close to RRH 402 so as to be positioned far away from RRH 401. The PRBs for UE 407 and 408 are scheduled to be in the same subframe n+1 using an appropriate power control mechanism, e.g., UE-specific or TP-specific power control. Furthermore, two UL RS from RRH 401 and RRH 402 are not coherently combined at respective receivers, i.e., the UEs, due to the network assigning different UL RS base sequences at the respective receivers. The network performs MU-MIMO multiplexing and assigns an orthogonal UL RS for the Rel-11 UE 406 and for the Rel-10 UE 403, without affecting the demodulation performance of the Rel-10 UE 403.

In order to increase the network throughput and in order to provide flexibility in implementation and/or scheduling, the network is able to efficiently support these diverse and dynamic transmission schemes. Accordingly, in order to facilitate these diverse and dynamic transmission schemes, as illustrated in FIG. 4, a control signaling design for advanced UEs, such as Rel-11 UEs, is described below according to an exemplary embodiment of the present invention.

According to an exemplary embodiment, a UL RS base sequence that is specific to a UE is described below. For a UE configured to generate a UE-specific UL RS base sequence, the UL RS base sequence is generated, in part, according to a Radio Resource Control (RRC) signaled parameter, RRC_S-CID. In a case where a UE is configured with two UE-specific UL RS base sequences, a first UL RS base sequence is generated with RRC_SCID1 and a second UL RS base sequence is generated with RRC_SCID2. According to the present exemplary embodiment, UE 404 may be configured to generate a UE-specific UL RS base sequence and the UE 404 receives the RRC parameter RRC_SCID=$\tilde{n}_{SCID2}$. The UE-specific UL RS base sequence, herein referred to as $\bar{r}_{u,v}(n)$, may be generated by determining a sequence group number u of the UL RS base sequence $\bar{r}_{u,v}(n)$ according $\tilde{n}_{SCID2}$ and an additional parameter X. The additional parameter X may be one bit quantity and may be any one of fixed to be 0 and not signaled, semi-statically signaled in the RRC layer, signaled using a Media Access Control (MAC) Control Element (CE), and dynamically signaled in a DCI format.

The sequence group number u may be determined from $\tilde{n}_{SCID2}$ and X according to the following three methods. According to the first method, $f_{ss}$ and $f_{gh}(n_s)$ are determined according to the legacy specifications for LTE, but the equation for determining the sequence group number $u \in \{0, 1, \ldots, 29\}$ may be modified in several ways. In a case where the sequence group number is calculated according to $u = (f_{gh}(n_s) + f_{ss} + \tilde{n}_{SCID2} \cdot (1+X)) \bmod 30$, the multiplication of $(1+X)$ expands the possible values for the sequence group number u. In a case where the sequence group number is calculated according to $u = (f_{gh}(n_s) + f_{ss} + \tilde{n}_{SCID2} \cdot X) \bmod 30$, the multiplication of X expands the possible values for the sequence group number u, and at the same time allows for dynamically switching between legacy sequence group number $u = (f_{gh}(n_s) + f_{ss}) \bmod 30$ and a newly configurable sequence group number $u = (f_{gh}(n_s) + f_{ss} + \tilde{n}_{SCID2}) \bmod 30$. In a case where the sequence group number is calculated according to $u = (f_{gh}(n_s) + f_{ss} + \tilde{n}_{SCID2} + X) \bmod 30$, the addition of X allows an eNB to flexibly choose the sequence group number u. For example, the eNB may configure a different base RS sequence for a UE as compared to a base RS sequence configured by a Channel State Information (CSI)-RS configuration.

According to a second method, the sequence group number u and $f_{ss}$ are determined according to legacy specifications for LTE, but $f_{gh}(n_s)$ is initialized in a manner described below. Accordingly, $f_{gh}(n_s)$ is determined according to Equation 14, given below.

$$f_{gh}(n_s) = \begin{cases} 0 & \text{if group hopping is disabled} \\ \left( \sum_{i=0}^{7} c(8n_s + i) \cdot 2^i \right) \bmod 30 & \text{if group hopping is enabled,} \end{cases} \quad \text{[Equation 14]}$$

wherein the pseudo random sequence c(i) initialized with $c_{init}$. The random sequence generator initialization value $c_{init}$ may be determined according to any one of the following equations, $$c_{init} = \left\lfloor \frac{N_{ID}^{cell} + \tilde{n}_{SCID2} \cdot (1+X)}{30} \right\rfloor,$$

$$c_{init} = \left\lfloor \frac{\tilde{n}_{SCID2} \cdot X}{30} \right\rfloor, \text{ and } c_{init} = \left\lfloor \frac{\tilde{n}_{SCID2} + X}{30} \right\rfloor.$$

According to a third method, the sequence group number u and $f_{gh}(n_s)$ are determined according legacy specifications for LTE, but $f_{ss}$ may be determined according to the method described below. Specifically, a Physical Uplink Control Channel (PUCCH) sequence-shift pattern $f_{ss}^{PUCCH}$ may be determined according to any one of the following equations: $f_{ss}^{PUCCH} = (N_{ID}^{cell} + \tilde{n}_{SCID2} \cdot (1+X)) \bmod 30$, $f_{ss}^{PUCCH} = (\tilde{n}_{SCID2} \cdot (1+X)) \bmod 30$, $f_{ss}^{PUCCH} = N_{ID}^{cell} + \tilde{n}_{SCID2} \cdot X) \bmod 30$, $f_{ss}^{PUCCH} = (\tilde{n}_{SCID2} \cdot X) \bmod 30$, $f_{ss}^{PUCCH} = N_{ID}^{cell} + \tilde{n}_{SCID2} + X) \bmod 30$, and $f_{ss}^{PUCCH} = (\tilde{n}_{SCID2} + X) \bmod 30$.

At the same time, a Physical Uplink Shared Channel (PUSCH) sequence-shift pattern $f_{ss}^{PUSCH}$ may be computed according to one of the two following methods. First, the PUSCH sequence-shift pattern may be determined according to an LTE Release-8 (Rel-8) equation in conjunction with the new PUCCH sequence-shift pattern $f_{ss}^{PUCCH}$, as described above, so that PUSCH is also TP-specifically scrambled according to the equation $f_{ss}^{PUSCH} = (f_{ss}^{PUCCH} + \Delta_{ss}) \bmod 30$, where $\Delta_{ss} \in \{0, 1, \ldots, 29\}$ is configured by higher layers. Alternatively, the PUSCH sequence-shift pattern may be determined according to Rel-8 UE behavior, so that PUSCH is not TP-specifically scrambled, and rather, is determined according to the equation $f_{ss}^{PUSCH} = (N_{ID}^{cell} + \Delta_{ss}) \bmod 30$.

Furthermore, according to another exemplary embodiment, the PUSCH sequence-shift pattern $f_{ss}^{PUSCH}$ and $u \in \{0, 1, \ldots, 29\}$ may be determined according to any one of the following equations: $f_{ss}^{PUSCH} = (f_{ss}^{PUCCH} + \tilde{n}_{SCID2} \cdot (1+X) + \Delta_{ss}) \bmod 30$, $f_{ss}^{PUSCH} = (f_{ss}^{PUCCH} + \tilde{n}_{SCID2} \cdot X + \Delta_{ss}) \bmod 30$, and $f_{ss}^{PUSCH} = (f_{ss}^{PUCCH} + \tilde{n}_{SCID2} + X + \Delta_{ss}) \bmod 30$. At the same time, the PUCCH sequence-shift pattern may be determined according to the equation $f_{ss}^{PUSCH} = N_{ID}^{cell} \bmod 30$.

In contrast to the UL RS base sequence that is specific to a UE, as described above, a UL RS base sequence that is specific to a TP is described below. According to an exemplary embodiment of the present invention, a UE may transmit an UL RS that is generated for a specific TP. In further detail, a UL RS base sequence is generated at least partly according to at least one of a virtual cell ID, a resourceConfig, a subframe-Config and an antennaPortsCount of the respective UE's CSI-RS configuration, such as a CSI-RS-Config as described in the Background Section, herein.

Accordingly, the subframeConfig, having a value of 0 to 31, may be used to determine subframes in which the CSI-RS are transmitted, according to Table 4, the antennaPortsCount, which has a value of 1, 2, 4, or 8, may be used to determine a number of antenna ports for which the CSI-RS are transmitted, and resourceConfig, having a value between 0 to 154, may be used to determine a CSI-RS pattern corresponding to the antennaPortsCount in a subframe in which the CSI-RS is transmitted according to Table 5. Furthermore, a Virtual cell ID may be used for initializing a scrambling sequence. For example, the virtual cell ID $N_{v-ID}^{cell}$ replaces $N_{ID}^{cell}$ in the CSI-RS and the UE-RS scrambling initializations when generating the UL RS base sequence. In other words, the UL RS base sequence $\bar{r}_{u,v}(n)$ is determined as a function of at least one of the virtual cell ID, the resourceConfig, the subframe-Config and the antennaPortsCount.

According to the present exemplary embodiment, other than signaling used for CSI-RS configuration for the CoMP scenario 4, little to no additional signaling may be used for configuring a UE-RS scrambling initialization for facilitating soft cell-partitioning. Furthermore, CSI-RS configurations may be different between respective TPs because different TPs often transmit respective CSI-RSs in different time-frequency resources. Thus, UEs that are transmitting to different TPs or Receive Points (RPs) transmit respective UL RSs that have different UL RS base sequences. For example, when a UE generates two different UL RSs that are respectively specific to two different TPs, a first TP-specific UL RS is generated with a first CSI-RS configuration of the UE, and a second TP-specific UL RS is generated with a second CSI-RS configuration of the UE.

Referring to FIG. 4, Macro-eNB 400 may transmit a CSI-RS according to a first CSI-RS configuration, CSI-RS-Config-1, RRH 401 may transmit a CSI-RS according to a second CSI-RS configuration, CSI-RS-Config-2, and RRH 402 may transmit a CSI-RS according to a third CSI-RS configuration, CSI-RS-Config-3. The three CSI-RS configurations are defined according to the following. The CSI-RS-Config-1 includes at least the following fields: a resourceConfig=RC1, a subframeConfig=SC1, an antennaPortCount=APC1, and a virtualCellID=VCID1. The CSI-RS-Config-2 includes at least the following fields: a resourceConfig=RC2, a subframeConfig=SC2, an antennaPortCount=APC2, and a virtualCellID=VCID2. The CSI-RS-Config-3 includes at least the following fields: a resourceConfig=RC3, a subframeConfig=SC3, an antennaPortCount=APC3, and a virtualCellID=VCID3. In the present exemplary embodiment, with reference to FIG. 4, UE 404, UE 405, and UE 406 are advanced UEs, which may implement both Rel-10 features as well as features introduced in Rel-11.

Furthermore, Rel-11 UEs may be configured to have more than one virtual cell ID for use in generating UL RS sequences such that the CSI-RS configurations may indicate a candidate set of virtual cell IDs. When a Rel-11 UE having more than on virtual cell ID uses a virtual cell ID $N_{v\text{-}ID}^{cell}$, the UE generates UL RS sequences according to the Rel-8 procedure, however, the cell ID is replaced with the virtual cell ID. Accordingly, a sequence group number is calculated according to $u=(f_{gh}(n_s)+f_{ss})\bmod 30$, and a group-hopping pattern $f_{gh}(n_s)$ for sequence group hopping, which is the same for PUSCH and PUCCH is given by Equation 15.

$$f_{gh}(n_s) = \begin{cases} 0 & \text{if group hopping} \\ & \text{is disabled} \\ \left(\sum_{i=0}^{7} c(8n_s+i)\cdot 2^i\right)\bmod 30 & \text{if group hopping} \\ & \text{is enabled,} \end{cases} \quad [\text{Equation 15}]$$

wherein the pseudo-random sequence c(i) is determined according to the methods described above, and the pseudo-random sequence generator is initialized with a value $$c_{init} = \left\lfloor \frac{N_{v\text{-}ID}^{cell}}{30} \right\rfloor$$

at the beginning of each radio frame.

Furthermore, a sequence shift pattern $f_{ss}$ differs between PUCCH and PUSCH. For PUCCH, the sequence-shift pattern $f_{ss}^{PUCCH}$ is determined according to the equation $f_{ss}^{PUCCH}=N_{v\text{-}ID}^{cell}\bmod 30$. For PUSCH, the sequence-shift pattern $f_{ss}^{PUSCH}$ is determined according to the equation $f_{ss}^{PUSCH}=(f_{ss}^{PUCCH}+\Delta_{ss})\bmod 30$, where $\Delta_{ss}\in\{0,1,\ldots,29\}$ is configured by higher layers. For sequence hopping, for reference-signals that have a length $M_{sc}^{RS}<6N_{sc}^{RB}$, the base sequence number v within the base sequence group is given by v=0. For reference-signals that have a length $M_{sc}^{RS}\geq 6N_{sc}^{RB}$, the base sequence number v within the base sequence group in slot $n_s$ is defined according to Equation 16.

$$v = \begin{cases} c(n_s) & \text{if group hopping is disabled} \\ & \text{and sequence hopping is enabled} \\ 0 & \text{otherwise,} \end{cases} \quad [\text{Equation 16}]$$

wherein the pseudo-random sequence c(i) is determined according to the methods described above, and the pseudo-random sequence generator is initialized with a value $$c_{init} = \left\lfloor \frac{N_{v\text{-}ID}^{cell}}{30} \right\rfloor \cdot 2^5 + f_{ss}^{PUSCH}$$

at the beginning of each radio frame. Additionally, the RS base sequence $(\bar{r}_{u,v}(n))$ may be generated according to the Rel-8 method, wherein the values of u and v calculated according to the above given equations of the present exemplary embodiment.

Additional methods of initializing the TP-specific UL RS are provided below. Referring to FIG. 4, and according to an exemplary embodiment, the UE 404 may be configured with CSI-RS-Config-1, and UE 404 transmits at least one of a PUSCH DM RS, a SRS and a PUCCH generated with a base sequence $\bar{r}_{u,v}(0),\ldots,\bar{r}_{u,v}(M_{sc}^{RS}-1)$, wherein the sequence group number u is generated depending on at least one of RC1, SC1, APC1 and an additional parameter, e.g., X. The additional parameter X may be a one bit quantity that is signaled in the manner described above with respect to previous exemplary embodiments.

The sequence group number u may be determined according to the values of ñSCID2 and X, as discussed above, wherein $\tilde{n}_{SCID2}$ is a function of RC=RC1, SC=SC1 and APC=APC1. The value $\tilde{n}_{SCID2}$ may be determined according to at least one of $\tilde{n}_{SCID2}=g(RC)$, $\tilde{n}_{SCID2}=g(RC))\cdot(I_{CSI\text{-}RS}\bmod 5)$, $\tilde{n}_{SCID2}=g(RC)\cdot(I_{CSI\text{-}RS}\bmod 80)$, and $\tilde{n}_{SCID2}=g(RC)\cdot\Delta_{CSI\text{-}RS}$. Herein, $\Delta_{CSI\text{-}RS}$ is CSI-RS subframe offset defined in Table 5 with $I_{CSI\text{-}RS}$ and g(RC) is a function of RC=RC1. The value of g(RC) may be determined according one of g(RC)=RC and g(RC), RC mod 10.

Referring to FIG. 4, according to another exemplary embodiment, in order to achieve CoMP operation, UE 405 may be configured with two CSI-RS configurations, i.e., CSI-RS-Config-1 and CSI-RS-Config-2 and may also be configured to generate TP-specific UL RS base sequences. In such a case, UE 405 selects one CSI-RS configuration from the two configurations in order to determine at least one of $\tilde{n}_{SCID2}$ and VCID. The UE 405 determines the at least one of and VCID according to the field values of the selected CSI-RS configuration and generates TP-specific UL RS base sequences.

The CSI-RS configuration to be used for determining the at least one of $\tilde{n}_{SCID2}$ and VCID may be selected according to one of the following methods. First, the CSI-RS configuration of the primary TP of a UE, that being the TP from which the UE receives the E-PDCCH, may be selected as the CSI-RS used for determining at least one of $\tilde{n}_{SCID2}$ and VCID. Second, the CSI-RS configuration selected for determining the at least one of $\tilde{n}_{SCID2}$ and VCID may be explicitly identified by a PHY signaling. For example, a one bit information field of a UL DCI format, e.g., DCI format 0/0A and DCI format 4, may be used to indicate either one of the two CSI-RS configurations. Third, the CSI-RS configuration selected for determining the at least one of $\tilde{n}_{SCID2}$ and VCID may be explicitly identified by a MAC CE signaling.

FIGS. 5A and 5B illustrate a MAC CE according to exemplary embodiments of the present invention.

Referring to FIGS. 5A and 5B, in the case where the CSI-RS configuration is selected according to the MAC control element signaling, frequent RRC reconfiguration may be avoided in a case where there is frequent reconfiguration of the at least one of $\tilde{n}_{SCID2}$ and VCID. FIG. 5A illustrates a new MAC CE having a bit A that is the one-bit information bit and bits R are reserved bits. Alternatively, as shown in FIG. 5B, the signaling bit may be included in another MAC CE that carries the control signaling for the target TPs, such as a Time Advance Command MAC CE for the target TPs. In the Time Advance Command MAC CE, 6 bits are used for the Time Advance Command, the bit A is the one-bit information bit and the bit R is the reserved bit.

According to another exemplary embodiment of the present invention, another method of selecting the CSI-RS configuration for determining the at least one of $\tilde{n}_{SCID2}$ and VCID, that being a fourth method, explicitly identifies the CSI-RS configuration via RRC signaling. In further detail, an RRC signaling identifies a single primary CSI-RS configuration from among the multiple CSI-RS configurations of a UE. In such a case, field values in the primary CSI-RS configuration are used to determine the at least one of $\tilde{n}_{SCID2}$ and VCID. For example, when UE 405 of FIG. 4 receives RRC signaling identifying that CSI-RS-Config-1 is the primary CSI-RS configuration, then the UE 405 receives a UE-RS scrambled with initialization $c_{init}$ with the at least one of the $\tilde{n}_{SCID2}$ and the VCID, wherein the at least one of the $\tilde{n}_{SCID2}$ and the VCID are determined according to the field values of the CSI-RS-Config-1.

In order for the RRC signaling to identify that the CSI-RS-Config-1 is a primary CSI-RS configuration a one-bit flag, i.e., primaryFlag field, may be introduced into each CSI-RS configuration so as to indicate whether the CSI-RS configuration is the primary CSI-RS configuration. For example, if the primaryFlag=1, then the associated CSI-RS configuration may be the primary CSI-RS configuration, whereas if the primaryFlag=0, then the associated CSI-RS configuration is not the primary CSI-RS configuration. Table 6, as shown below, shows an example of a RRC signaling message that consists of two CSI-RS configurations, i.e., CSI-RS-Config-1 and CSI-RS Config-2. In Table 6, the CSI-RS-Config-1 (shown as csi-RS1 in Table 6) is flagged to be a primary CSI-RS configuration with the setting of primaryFlag=1.

TABLE 6

```
csi-RS1             {
   setup                {
      antennaPortsCount = APC1,
      resourceConfig = RC1,
      subframeConfig = SC1,
      p-C-r11 = PC1
      primaryFlag = 1
   }
}
csi-RS2             {
   setup                {
      antennaPortsCount = APC2,
      resourceConfig = RC2,
```

TABLE 6-continued

```
      subframeConfig = SC2,
      p-C-r11 = PC2,
      primaryFlag = 0
   }
}
```

According to another exemplary embodiment, a single RRC signaling message includes two CSI-RS configurations, i.e., CSI-RS-Config-1 and CSI-RS-Config-2, as shown in Table 7. In such a case, where the single RRC signaling message includes two CSI-RS configurations, the signaling message is sent to UE 405, which will use the first CSI-RS configuration, i.e., CSI-RS-Config-1, included in the RRC signaling message to determine $n^{(1)}_{SCID2}$.

TABLE 7

```
csi-RS1             {
   setup                {
      antennaPortsCount = APC1,
      resourceConfig = RC1,
      subframeConfig = SC1,
      p-C-r11 = PC1
   }
}
csi-RS2             {
   setup                {
      antennaPortsCount = APC2,
      resourceConfig = RC2,
      subframeConfig = SC2,
      p-C-r11 = PC2
   }
}
```

Furthermore, in order to determine the $\tilde{n}_{SCID2}$ several methods may be used in order to determine the $\tilde{n}_{SCID2}$ with respect to various requirements. For example, the single CSI-RS configuration may be used to determine a $\tilde{n}_{SCID2}$ having the smallest g(RC). In a case where g(RC)=RC, wherein RC1=7 and RC2=15, UE 405 uses CSI-RS-Config-1 to determine $\tilde{n}_{SCID2}$. In a case where g(RC)=RC mod 10, wherein RC1=7 and RC2=15, UE 405 uses CSI-RS-Config-2 to determine $\tilde{n}_{SCID2}$.

Alternately, the single CSI-RS configuration may be used to determine a having the smallest period, i.e., $T_{CSI-RS}$, wherein $T_{CSI-RS}$ is a CSI-RS period derived with $I_{CSI-RS}$=SC, as shown in Table 5. In such a case, when SC1 yields a period $T_{CSI-RS}$=5 and SC2 yields a period $T_{CSI-RS}$=10, the UE 405 uses CSI-RS-Config-1 for determining $\tilde{n}_{SCID2}$. On the other hand, the single CSI-RS configuration may be used to determine a $n_{SCID2}$ having the largest period, i.e., $T_{CSI-RS}$, wherein $T_{CSI-RS}$ is a CSI-RS period derived with $I_{CSI-RS}$=SC, as shown in Table 5. In such a case, when SC1 yields a period $T_{CSI-RS}$=5 and SC2 yields a period $T_{CSI-RS}$10, then UE 405 uses CSI-RS-Config-2 for determining $\tilde{n}_{SCID2}$.

Furthermore, the single CSI-RS configuration may be used to determine a $\tilde{n}_{SCID2}$ having the smallest offset, i.e., $\Delta_{CSI-RS}$, wherein $\Delta_{CSI-RS}$ is a CSI-RS subframe offset derived with $I_{CSI-RS}$=SC, as shown Table 5. In such a case, when SC1 yields an offset $\Delta_{CSI-RS}$=5 and SC2 yields an offset $\Delta_{CSI-RS}$=10, UE 405 uses CSI-RS-Config-1 for determining $\tilde{n}_{SCID2}$. On the other hand, the single CSI-RS configuration may be used to determine a $\tilde{n}_{SCID2}$ that has the largest offset, i.e., $\Delta_{CSI-RS}$, wherein $\Delta_{CSI-RS}$ is a CSI-RS subframe offset derived with $I_{CSI-RS}$=SC, as shown in Table 5. In such a case, when SC1 yields an offset $\Delta_{CSI-RS}$=5 and SC2 yields an offset $\Delta_{CSI-RS}$=10, then UE 405 uses CSI-RS-Config-2 for determining $\tilde{n}_{SCID2}$.

Figure 6:
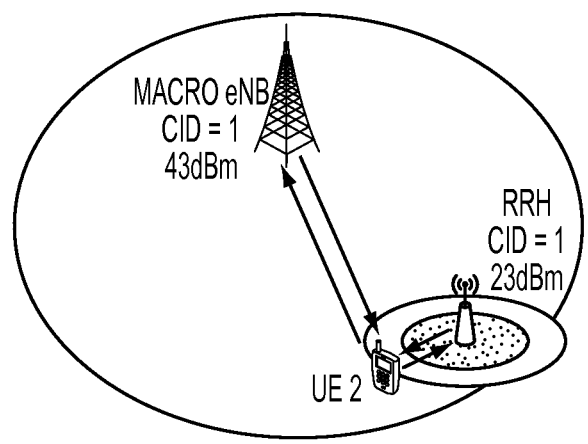
FIG. 6 illustrates a Path Loss (PL) estimate for a Wireless Communication System including Remote Radio Heads (RRHs) according to exemplary embodiments of the present invention.

FIG. 6 illustrates a Path Loss (PL) estimate for a Wireless Communication System including Remote Radio Heads (RRHs) according to exemplary embodiments of the present invention.

Referring to FIG. 6, in order to achieve a balance between continuous connectivity and UE battery saving as well as network interference reduction, an uplink power control method for a network with distributed RRHs may include several features. For example, in a case of TP-common transmissions, such as MU-MIMO-multiplexed transmission with legacy UEs, i.e., UEs up to Rel-10 UEs, a UE may transmit at a relatively high transmission power in order to compensate for a larger PL between the UE and the TPs. On the other hand, in a case of TP-specific transmissions, the uplink transmission power may be set at a relatively low value so that the UE may save battery power by communicating with a nearby RRH. In order to achieve the balance between continuous connectivity and UE battery saving as well as network interference reduction, a Pathloss (PL) estimation may include a CSI-RS based PL estimation and Reference power setting at each TP. Furthermore, UL power control equations may include the CSI-RS based PL estimation. Also, when and/or how to switch between a Common RS (CRS)-based PL estimate and CSI-RS based PL estimate may be determined.

Furthermore, overestimation of the PL should be prevented. Accordingly, for a kth TP, an additional PL estimate may be obtained using the associated CSI-RS, denoted E_PL(k). Also, for the kth TP, a reference transmission power of the associated CSI-RS may be included in a broadcast message, such as the csi-referenceSignalPower message. The value of E_PL(k) may be derived such that E_PL(k)=csi-referenceSignalPower of the kth TP, wherein a RS Received Power (RSRP) may be based on the CSI-RS of the kth TP (E-RSRP (k)), in order to allow for an accurate estimate of the PL from the UE to each of the neighboring TPs.

The RSRP based on the CSI-RS may be defined according to the following. The RSRP may be defined as a linear average over the power contributions (in Watts) of resource elements that carry the CSI-RS within a frequency bandwidth that is being measured. Accordingly, the CSI-RSs used for determining RSRP may be any one of the following: the CSI-RS $R_{15}$; all of the CSI-RSs that are configured according to the CSI-RS configuration of k-th TP; and the CSI-RS port number that are used for RSRP determination as explicitly signaled by RRC.

Uplink Power Control (PC) equations for TP-common transmission and for TP-specific transmission may be different from each other. For TP-common transmissions, which may also be referred to as or CRS-based transmission, a UE may reuse the Rel-10 equation and CRS-based PL estimate. For the TP-common transmissions, the PUSCH transmission power is calculated according to Equation 17, given below.

$$P_{PUSCH,c}^{common}(i) = \min \begin{cases} P_{CMAX,c}(i), \\ 10\log_{10}(M_{PUSCH,c}(i)) + P_{O\_PUSCH,c}(j) + \alpha_c(j) \cdot \\ PL_c + \Delta_{TF,c}(i) + f_c(i) \end{cases},$$ [Equation 17]

wherein $P_{CMAX,c}(i)$ is a configured UE transmit power in subframe i for serving cell c, $M_{PUSCH,c}(i)$ is a number of resource blocks of the PUSCH resource assignment that are valid for subframe i and serving cell c, and $f_c(i)$ is the current PUSCH power control adjustment state for serving cell c. Furthermore, $P_{O\_PUSCH,c}(j)$ is configured by higher layers, wherein, in a case of j=0, PUSCH transmissions correspond to a semi-persistent grant, in a case of j=1, PUSCH transmissions correspond to a dynamic scheduling grant, and in a case of j=2, PUSCH transmissions correspond to a random access response grant. Furthermore, with respect to Equation 17, in the case of j=0 or 1, $\alpha_c \in \{0, 0.4, 0.5, 0.6, 0.7, 0.8, 0.9, 1\}$ is a 3-bit parameter provided by higher layers for serving cell c, and in the case of j=2, $\alpha_c(j)=1$. Additionally, $\Delta_{TF,c}(i)=10\log_{10}((2^{BPRE \cdot K_s}-1) \cdot \beta_{offset}^{PUSCH})$ in a case of $K_s=1.25$ and $\Delta_{TF,c}(i)=0$ in a case of $K_s=0$ where $K_s$ is given by a parameter deltaMCS-Enabled that is provided by higher layers for each serving cell c, and BPRE is a number of bits per resource element, and $\beta_{offset}^{PUSCH}$ in a higher-layer configured offset value. However, it is noted that a UE may be configured with more than one CRS-based UL PC value. For example, a UE may be configured with two CRS-based UL PC values, such that a first UL PC value may be determined according to a first $PL_c$ derived with a first set of CRSs of a first cell, and a second UL PC value may be determined according to a second $PL_c$ derived with a second set of CRSs of a second cell.

For TP-specific transmissions, the PUSCH transmission power may be determined by swapping at least one of the parameters, $PL_c$, $P_{O\_PUSCH,c}(j)$, $\alpha_c(j)$ $\Delta_{TF,c}(i)$ and $f_c(i)$ with corresponding parameters, $PL_{c,E}$, $P_{O\_PUSCH,c,E}(j)$, $\alpha_{c,E}(j)$ and $f_{c,E}(i)$. Accordingly, the PUSCH transmission power may be determined according to Equation 18, given below.

$$P_{PUSCH,c}^{TP-specific}(i) = \min \begin{cases} P_{CMAX,c}(i), \\ 10\log_{10}(M_{PUSCH,c}(i)) + P_{O\_PUSCH,c,E}(j) + \alpha_{c,E}(j) \cdot \\ PL_{c,E} + \Delta_{TF,c}(i) + f_{c,E}(i) \end{cases}$$ [Equation 18]

Alternatively, the PUSCH transmission power may be determined according to Equation 19, given below.

$$P_{PUSCH,c}^{TP-specific}(i) = \min \begin{cases} P_{CMAX,c}(i), \\ 10\log_{10}(M_{PUSCH,c}(i)) + P_{O\_PUSCH,c}(j) + \alpha_c(j) \cdot \\ PL_{c,E} + \Delta_{TF,c}(i) + f_{c,E}(i) \end{cases}$$ [Equation 19]

However, it is noted that a UE may be configured with more than one TP-specific UL PC value. For example, a UE may be configured with two TP-specific UL PC values, such that a first UL PC value is determined according to a first set of parameters $PL_{c,E}$, $P_{O\_PUSCH,c,E}(j)$, $\alpha_{c,E}(j)$, and $f_{c,E}(i)$ derived with a first set of CSI-RSs, and a second UL PC value is determined according to a second of parameters.

In the case of UE-specific transmissions, a PUSCH transmission power may be determined by adding a UE-specific offset to $PL_c$, such as $\Delta PL_c$ and/or $f_{c,E}(i)$, wherein the UE-specific offset $\Delta PL_c$ may be a RRC configured parameter. For example, the PUSCH transmission power may be determined according to Equation 20, given below.

$$P_{PUSCH,c}^{UE-specific}(i) = \min \begin{cases} P_{CMAX,c}(i), \\ 10\log_{10}(M_{PUSCH,c}(i)) + P_{O\_PUSCH,c}(j) + \\ \alpha_c(j) \cdot (PL_{c,E} + \Delta PL_c) + \Delta_{TF,c}(i) + f_{c,E}(i) \end{cases}$$ [Equation 20]

Alternatively, the PUSCH transmission power may be determined according to Equation 21, given below.

$$P_{PUSCH,c}^{UE-specific}(i) = \min\left\{\begin{array}{l} P_{CMAX,c}(i), \\ 10\log_{10}(M_{PUSCH,c}(i)) + P_{O\_PUSCH,c}(j) + \alpha_c(j) \cdot \\ (PL_{c,E} + \Delta PL_c) + \Delta_{TF,c}(i) + f_c(i) \end{array}\right\}$$ [Equation 21]

However, as noted above, a UE may be configured with more than one UE-specific UL PC value. For example, in a case where a UE has two UE-specific UL PC values, a first UL PC value may be determined according to a first PL offset, and a second UL PC value may be determined according to a second PL offset.

With respect to both Equation 20 and 21, $PL_{c,E}$ is derived as a function of E_PL(1), E_PL(2), ..., E_PL($N_{UL}$), wherein $N_{UL}$ is a number of TPs or RPs that may participate in UL CoMP reception. There are several methods for configuring a set of TPs for UL CoMP reception, which may also be referred to as a UL CoMP measurement set $\{1, ..., N_{UL}\}$. For example, a first method may configure a set of TPs or CSI-RS configurations for the UL CoMP according to the DL CoMP measurement set, wherein the DL CoMP measurement set is the set of TPs to which the UE is configured to report CSI. In further detail, a first case may be that the set of TPs for UL CoMP is identical to the DL CoMP measurement set. Another case may be that the set of TPs for UL CoMP is a subset of the DL CoMP measurement set, and the subset is configured by RRC operations.

Alternatively, a second method may configure a set of TPs or CSI-RS configurations for UL CoMP according to RRC operations. Furthermore, a third method may configure the set of TPs or CSI-RS configurations for UL CoMP according to a Radio Resource Management (RRM) measurement set. The RRM measurement set is a set of TPs to which the UE reports the RSRP, wherein the RSRP may be measured according to the CSI-RS. In an exemplary case, the set of TPs for UL CoMP may be identical to the RRM measurement set. Furthermore, when a UE's UL CoMP measurement set is composed of a single TP, then $PL_{c,E}$=E_PL and is estimated using the CSI-RS according to the single CSI-RS configuration for the single TP.

On the other hand, when a UE's UL CoMP measurement set is composed of $N_{UL}$ multiple TPs, $PL_{c,E}$ may be derived from E_PL(1), E_PL(2), ..., E_PL($N_{UL}$) as described below. The $PL_{c,E}$ may be derived as a minimum from among all E_PL(k), wherein k=1, ..., $N_{UL}$, so as to generate the smallest pathloss estimate. Alternatively, $PL_{c,E}$ may be derived from a linear average over all E-PL(k), k=1, ..., $N_{UL}$. Furthermore, $PL_{c,E}$ may be derived from E-PL(0), which is the primary TP, which may also be referred to as the central TP or the preferred TP. As a further alternative, $PL_{c,E}$ may be derived from E-PL(k), where k is configured by a higher layer such as the RRC layer. As yet another alternative, $PL_{c,E}$ may be derived from a combination of the alternatives described above.

With respect to Equation 20, in a manner similarly to that used for $f_c(i)$, $f_{c,E}(i)$ is updated by a Transmit Power Control (TPC) command included in a DCI format, such as a DL/UL grant, and format 3/3A which is used in LTE. According to an exemplary embodiment, a first TPC command updates only $f_c(i)$, a second TPC command updates only $f_{c,E}(i)$, and a third TPC command updates both $f_c(i)$ and $f_{c,E}(i)$. Examples of the first TPC command and the second TPC command will be described further below.

With reference to Equations 20 and 21, the $P_{O\_PUSCH,c,E}(j)$ and $\alpha_{c,E}(j)$ may be configured separately from $P_{O\_PUSCH,c}(j)$ and $\alpha_c(j)$ by the RRC layer.

Herein, it is noted that a similar enhancement may be applied to the UL PC equation for a PUSCH having a simultaneous a PUCCH, for a PUCCH and for a SRS, and also may be applied to a power headroom equation. For example, in the LTE Rel-10 specification, the SRS power control may be determined according to Equation 23, shown below.

$$P_{SRS,c}(i) \min\{P_{CMAX,c}(i), P_{SRS\_OFFSET,c}(m) + 10\log_{10}(M_{SRS,c}) + P_{O\_PUSCH,c}(j) + \alpha_c(j) \cdot PL_c + f_c(i)\}$$ [Equation 23]

In contrast to Equation 23, and in a manner similar to that of the case of PUSCH, the SRS transmission power may be determined by swapping at least one of the following parameters of Equation 23, $PL_c$, $P_{O\_PUSCH,c}(j)$, $\alpha_c(j)$, $P_{SRS\_OFFSET,c}(m)$ and $f_c(i)$ with a corresponding parameter from among $PL_{c,E}$, $P_{O\_PUSCH,c,E}(j)$, $\alpha_{c,E}(j)$, $P_{SRS\_OFFSET,c,E}(m)$ and $f_{c,E}(i)$. Thus, according to the present exemplary embodiment, the SRS power control may be determined according to Equation 24, given below.

$$P_{SRS,cE}(i) = \min\{P_{CMAX,c}(i), P_{SRS\_OFFSET,E}(m) + 10\log_{10}(M_{SRS,c}) + P_{O\_PUSCH,E}(j) + \alpha_{c,E}(j) \cdot PL_{c,E} + f_{c,E}(i)\}$$ [Equation 24]

In order to switch between a TP-common UL PC, which may also be referred to as a cell-specific UL PC, and a TP-specific UL PC and/or in order to switch between a cell-specific UL RS and a TP-specific UL RS, which may also be referred to as a UE-specific UL RS, a method for base sequence generation may be instructed by the Macro-eNB, such as the Macro-eNB 400 of FIG. 4. The switching between the various UL PCs and UL RSs may be accomplished in accordance with a state in an Information Element (IE) according to an exemplary embodiment of present invention, as described below. According to an exemplary embodiment, an N-bit IE, which is referred to as a UL RS base sequence IE, is signaled to a UE in order to indicate a specific UL RS base sequence generation method from among $2^N$ candidate methods, which include methods for transmission of a PUSCH DMRS, a SRS, and a PUCCH.

In a case where N=1, such that that N-bit IE is a 1-bit IE, the IE may be used to indicate one of two states respectively corresponding to two candidate methods. For example, state 0 may correspond to a Rel-10 compatible UL RS generation method, which may also be a cell specific or TP common UL RS generation method, and state 1 may correspond to a TP-specific UL RS base sequence generation method. In another case, wherein N=1, state 0 may still correspond to a Rel-10 compatible UL RS generation method, however, state 1 may correspond to a UE-specific UL RS base sequence generation method. In yet another case, state 0 may correspond to a first UE-specific or TP-specific UL RS, and state 1 may correspond to a second UE-specific or TP-specific UL RS, wherein the first TP-specific UL RS is generated according to a first VCID, while the second TP-specific UL RS is generated according to a second VCID.

When including the two states in the 1-bit IE in a DCI format, the network, or Macro-eNB, may flexibly schedule transmissions for an advanced UE, such as the Rel-11 UE. More specifically, the Macro-eNB may dynamically change MU-MIMO pairing of an advanced UE such that it is paired with a UE from a first group of UEs or with a UE from a second group of UEs. Also, the Macro-eNB may dynamically change transmission schemes between Single User (SU)-

MIMO and MU-MIMO for an advanced UE. Furthermore, the Macro-eNB may dynamically change transmission schemes between single-TP operation and CoMP scheduling for an advanced UE.

According to another exemplary embodiment, an N-bit IE for indicating a UL PC method to a UE may be a UL PC IE. The UL PC IE may also be used to indicate a TPC update method from among $2^N$ candidate methods. For example, if N=1, there are two candidate methods. In a first case, state 0 of the UL PC IE may correspond to a TP-common UL PC, wherein, for the UL TPC, only the $f_c(i)$ is updated, and state 1 of the UL PC IE may correspond to one of a TP-specific UL PC or a UE-specific UL PC, wherein, for the UL TPC, only $f_{c,E}(i)$ is updated. In another case, state 0 of the UL PC IE may still correspond to a TP-common UL PC, wherein, for the UL TPC, only the $f_c(i)$ is updated, and state 1 of the UL PC IE may still correspond to one of a TP-specific UL PC or a UE-specific UL PC, however, for the UL TPC, both $f_c(i)$ and $f_{c,E}(i)$ are updated. In yet another case, state 0 of the UL PC IE may correspond to a first CRS-based UL PC, and state 1 of the UL PC IE may correspond to a second CRS-based UL PC. Furthermore, in another case, state 0 of the UL PC IE may correspond to one of a first TP-specific UL PC and a first UE-specific UL PC, and state 1 of the UL PC IE may correspond to one of a second TP-specific UL PC and a second UE-specific UL PC.

Figure 7:
FIG. 7 illustrates a MAC CE for Timing Advance (TA) according to exemplary embodiments of the present invention.
Figure 7:

FIG. 7 illustrates a MAC CE for Timing Advance (TA) according to exemplary embodiments of the present invention.

Referring to FIG. 7, an N-bit IE for indicating a UL PC method to a UE may be a UL Timing Advance (TA) IE that may be signaled to a UE for indicating a UL TA method out of $2^N$ candidate TA methods. For example, if N=1, there are two candidate methods. The two candidate TAs may be independently configured by separate MAC Control Elements, as shown in FIG. 7. Particularly, in the MAC CE for TA of FIG. 7, A is one-bit of information that indicates a corresponding TA, and R is a reserved bit. For example, when A=0, the MAC CE configures a first TA, and when A=1, the MAC CE configures a second TA. With respect to the UL TA IE, state 0 may correspond to a TP-common UL TA that is compatible with Rel-10 UEs, and state 1 of the UL TA IE may correspond to a TP-specific UL TA.

According to another exemplary embodiment, an N-bit IE for indicating a set of at least two of a UL PC method, a TPC method, a UL RS base sequence generation method and a UL TA method to a UE may be a UL TX Config IE. The UL TX Config IE may indicate any one of the UL PC method, the TPC method, the UL RS base sequence generation method and the UL TA from among $2^N$ candidate methods. For example, if N=1, there are two sets of candidate methods. In a first case, state 0 of the UL TX Config IE may correspond to a UL PC method that is one of a TP-common or cell-specific UL PC, a UL TPC method that only updates $f_c(i)$, and a UL RS base sequence generation method that generates a TP-common or cell-specific UL RS, and state 1 of the UL TX Config IE may correspond to a UL PC method that is a TP-specific UL PC, a UL TPC method that only updates $f_{c,E}(i)$, and a UL RS base sequence generation method that generates a TP-specific UL RS.

In another case, state 0 of the UL TX Config IE may correspond to a UL PC method that is one of a TP-common or cell-specific UL PC, a UL TPC method that only updates $f_c(i)$, and a UL RS base sequence generation method that generates a TP-common or cell-specific UL RS, and state 1 of the UL TX Config IE may correspond to a UL PC method that is a TP-specific UL PC, a UL TPC method that only updates $f_{c,E}(i)$, and a UL RS base sequence generation method that generates a UE-specific UL RS. In yet another case, state 0 of the UL TX Config IE may correspond to a UL PC method that is one of a TP-common or cell-specific UL PC, a UL TPC method that only updates $f_c(i)$, a UL RS base sequence generation method that generates a TP-common or cell-specific UL RS and a UL TA method that is TP-common according to a first TA command, and state 1 of the UL TX Config IE may correspond to a UL PC method that is a TP-specific UL PC, a UL TPC method that only updates $f_{c,E}(i)$, and a UL RS base sequence generation method that generates a UE-specific UL RS, and a UL TA method that is TP-specific according to a second TA command.

Furthermore, in another case, state 0 of the UL TX Config IE may correspond to a UL PC method that is one of a first UE-specific or TP-specific UL PC, a UL TPC method that only updates $f_c(i)$, a UL RS base sequence generation method that generates a first UE-specific or TP-specific UL RS and a UL TA method that is a first UE-specific or TP-specific TA method, and state 1 of the UL TX Config IE may correspond to a UL PC method that is a second UE-specific or TP-specific UL PC, a UL TPC method that only updates $f_{c,E}(i)$, and a UL RS base sequence generation method that generates a second UE-specific or TP-specific UL RS, and a UL TA method that is a TP-specific TA method. Furthermore, in yet another case, state 0 of the UL TX Config IE may correspond to a UL PC method that is one of a first UE-specific or TP-specific UL PC, and a UL RS base sequence generation method that generates a first UE-specific or TP-specific UL RS, and state 1 of the UL TX Config IE may correspond to a UL PC method that is a second UE-specific or TP-specific UL PC, and a UL RS base sequence generation method that generates a second UE-specific or TP-specific UL RS. Furthermore, the present invention is not limited to the above described structures for the UL TX Config IE, and any other suitable combination of indicating a UL PC method, a UL TPC method, a UL RS base sequence generation method and a UL TA method may be used.

In order to transmit the IEs, which may be referred to as additional IEs, discussed above, that is, the UL Tx Config IE, the UL RS base sequence IE, the UL TA IE and the UL PC IE, several different transportation methods may be used. For example, the additional IEs may be transmitted in an RRC layer in a wireless communication system. Alternatively, a new UL grant DCI format may be constructed by extending an existing UL grant DCI format (e.g., DCI format 0/0A/4) to include the additional IEs. For example, the new UL grant DCI format may be constructed by adding a N=1 bit field to an existing DCI format for the additional IE, wherein the additional IE=0 if the new one bit field value is 0 and the additional IE=1 if the new one bit field value is 1.

According to another exemplary embodiment, the additional IEs may be transmitted via a new Semi-Persistent Scheduling (SPS) activation DCI format that may be constructed by modifying an existing SPS activation DCI format to include the additional IEs. When SPS activation is received with the additional IEs, the UE transmits all the PUSCHs configured by the SPS activation according to a value of the additional IE. For example, the new SPS grant DCI format may be constructed by re-defining an SPS activation PDCCH validation condition to be an existing DCI format for the additional IE. In further detail, an SPS activation PDCCH may be validated when all the fields satisfy a legacy SPS activation condition, except for one field which may have an additional state for validating the SPS activation. The one field having dual states to validate the SPS activation PDCCH, such as TPC command for scheduled PUSCH, may indicate the new IE value, as illustrated in Table 8, shown below.

TABLE 8

| Field | Legacy SPS activation condition: DCI format 0 | Proposed SPS activation condition: DCI format 0 |
|---|---|---|
| TPC command for scheduled PUSCH | Set to '00' | Set to '11' → the New IE = 1<br>Set to '00' → the New IE = 0 |
| Cyclic shift DM RS | set to '111' | set to '111' |
| Modulation and coding scheme and redundancy version | MSB is set to '0' | MSB is set to '0' |
| HARQ process number | N/A | N/A |
| Modulation and coding scheme | N/A | N/A |
| Redundancy version | N/A | N/A |

According to another exemplary embodiment, the additional IEs may be indicated by the control channel location or type upon which a UL/DL grant is transmitted. For example, the additional IE=0 if the UL grant is transmitted on the legacy PDCCH, and the additional IE=1 if the UL grant is transmitted on the E-PDCCH. Alternatively, the additional IE=0 if the UL grant is of one DCI format, and the additional=1 if the UL grant is of another DCI format. In another case, the additional IE=0 if a PUCCH HARQ-ACK is for a DL grant transmitted on the legacy PDCCH, and the new IE=1 if a PUCCH HARQ-ACK is for a DL grant transmitted on the E-PDCCH. In yet another case, the additional IE=0 if a PUCCH HARQ-ACK is for a PDSCH whose UE-RS is scrambled with Rel-10 compatible cell-specific UE-RS scrambling, and the new IE=1 if a PUCCH HARQ-ACK is for a PDSCH whose UE-RS is scrambled with TP-specific (or UE-specific) UE-RS scrambling. In such a case, the PDSCH scrambling method may be explicitly indicated by a bit in the DL grant DCI format. Furthermore, the additional IE=0 for the Random Access Response Grant UL transmission (Message 3) if the Random Access Response grant was transmitted using the legacy PDCCH, and the new IE=1 for the Random Access Response Grant UL transmission (Message 3) if the Random Access Response grant was transmitted using the E-PDCCH. According to yet another case, the additional IE=0 for the Random Access Response Grant UL transmission (Message 3) if the corresponding PDCCH order to initiate random access procedure was transmitted using the legacy PDCCH; the new IE=1 for the Random Access Response Grant UL transmission (Message 3) if the corresponding PDCCH order to initiate random access procedure was transmitted using the E-PDCCH.

According to another exemplary embodiment, the additional IEs may be indicated by a new DCI format 1A that is used as PDCCH in order to initiate a random access procedure that is constructed by reusing one of the reserved bits of the DCI format 1A as the additional IE which determines the UL transmission method for the Random Access Response Grant transmission. According to another exemplary embodiment, the additional IEs may be indicated by another new DCI format that is used for a Random Access Response that is constructed by extending an existing DCI format, such as DCI format 1C/1A, in order to include the newly introduced IE, which determines the UL transmission method for the Random Access Response Grant.

Furthermore, according to another exemplary embodiment, the additional IEs may be explicitly identified by a MAC control element signaling. In the present exemplary embodiment, in a first case, a MAC CE may be used for signaling, wherein a bit A of the MAC CE is a state of the newly introduced IE and bits R are reserved bits. In another case a signaling bit may be included in another MAC CE, such as a TA Command MAC CE for the target TPs. In such a case, 6 bits of the MAC CE may be used for a TA Command, a bit A of the MAC CE is a value of the additional IE and a bit R is a reserved bit, wherein A determines methods for generating a UL RS base sequence and a UL PC, and the TA command determines how the UE should execute TA for subsequent UL transmissions.

According to an exemplary embodiment of the present invention, in order to indicate the additional IEs, such as the UL TX Config IE, the UL RS base sequence IE, the UL TA IE, and the UL PC IE, for SRS transmission, several methods may be followed. According to a first method, for SRS, a value of the additional IE may be indicated by the SRS type. For example, the additional IE=0 if the SRS is a periodic SRS and the additional IE=1 if the SRS is aperiodic SRS. In such a case, if transmission is predominantly local, a periodic SRS transmission targeting local TP may be used so that the network may only use a UE to transmit the SRS with high power for only CoMP set determination. In another case, the additional IE=0 if the SRS is an aperiodic SRS and the new IE=1 if the SRS is a periodic SRS. In such a case, because periodic SRSs are transmitted in multiple subframes in a periodic manner, the Macro-eNB may consider multiplexing periodic SRS transmissions from both Rel-11 and legacy UEs. When considering the multiplexing of Rel-11 and legacy UEs for periodic SRS transmissions, applying a legacy PC equation to Rel-11 UEs may reduce interference. On the other hand, an aperiodic SRS may dynamically triggered, and hence the Macro-eNB may flexibly multiplex only Rel-11 UEs which are using the PC equation of the present exemplary embodiments in an SRS bandwidth.

According to another method of indicating the additional IEs for SRS transmission, for each type of SRS, the new IE is independently configured in RRC. In other words, for periodic SRS, the new IE is configured with a first value, and for aperiodic SRS, the new IE is configured with a second value. According to another method, multiple periodic SRSs may be configured for a same component carrier, where the additional IE is configured, in the RRC layer, per each periodic SRS. For example, when a UE is configured with two periodic SRS, a first value is configured for the additional IE of a first periodic SRS, and a second value is configured for the additional IE of a second periodic SRS. According to yet another method of indicating the additional IEs for SRS transmission, for an aperiodic SRS, a value of the additional IE may jointly indicated by a value of SRS triggering bits and the DCI format triggering the aperiodic SRS. For example, for Rel-10 UEs, 5 parameter sets may be defined for aperiodic SRS transmissions, and one parameter set may be used to generate the SRS that is indicated by the value of the SRS triggering bits and the DCI format triggering the aperiodic SRS. According to the present exemplary embodiments discussed above, the additional IEs may be included in each of the parameter sets for Rel-11 UEs.

Power control and base sequences for aperiodic SRS will be discussed below. In the legacy LTE specifications, such as Rel-9 and Rel-10, the SRS power control equation is given by Equation 25, shown below.

$$P_{SRS,c}(i) \min\{P_{CMAX,c}(i), P_{SRS\_OFFSET,c}(m)+10 \log_{10}(M_{SRS,c})+P_{O\_PUSCH,c}(j)+\alpha_c(j) \cdot PL_c+f_c(i)\}$$ [Equation 25]

wherein, $P_{SRS\_OFFSET,c}(m)$ is a 4-bit parameter that is semi-statically configured by higher layers for m=0 and m=1 for a serving cell c. For an SRS transmission having trigger type 0, which is for a periodic SRS, then m=0 and for an SRS transmission having trigger type 1, which is for an aperiodic SRS, then m=1.

According to an exemplary embodiment of the present invention, in order to facilitate a Time Division Duplex (TDD) DL CoMP CSI estimation as well as UL CoMP operations, Equation 25 may be modifies such that the $P_{SRS\_OFFSET,c,E}(m)$ may be introduced and may be configured by the RRC layer so as to be UE-specific while other parameters of Equation 25 may be the same as noted above. Accordingly, Equation 25 may be modified, according to the present exemplary embodiment, in a manner shown in Equation 26, given below.

$$P_{SRS,c,E}(i) \min\{P_{CMAX,c}(i), P_{SRS\_OFFSET,c,E}(m)+10 \log_{10}(M_{SRS,c})+P_{O\_PUSCH,c}(j)+\alpha_c(j) \cdot PL_c+f_c(i)\}$$ [Equation 26]

However, Equation 26 may only apply for aperiodic SRS, in which case, $P_{SRS\_OFFSET,c,E}(0)$ may not be introduced and only $P_{SRS\_OFFSET,c,E}(1)$ may be introduced. In other words, an advanced UE may be configured by the RRC layer so as to be UE-specific with the additional $P_{SRS\_OFFSET,c}(m)$ for m=2 to be used for the SRS power control equation of $P_{SRS,c}(i)$. Furthermore, $P_{SRS\_OFFSET,c}(2)$ may be used for aperiodic SRS power control.

According to an exemplary embodiment of the present invention, the advanced UE, such as a Rel-11 UE, may be informed of which $P_{SRS\_OFFSET,c}$ and which SRS base sequence to use when an aperiodic SRS is triggered. Accordingly, the value of m and a base sequence generation method for the aperiodic SRS are indicated by the SRS triggering bits and the triggering DCI format type.

According to a legacy LTE specification, parameters for aperiodic SRS generation may be indicated according to the following. In a case of a trigger type 1 and a DCI format 4, there are three sets of SRS parameters, srs-ConfigApDCI-Format4, that may be configured by higher layer signaling. Furthermore, a 2-bit SRS request field, used in DCI format 4, indicates the SRS parameter set, which is shown below in Table 9. For the trigger type 1 and the DCI format 0, a single set of SRS parameters, srs-ConfigApDCI-Format0, may be configured by higher layer signaling. In the case of the trigger type 1 and DCI formats 1a2b/2c, a single common set of SRS parameters, srs-ConfigApDCI-Format1a2b2c, may be configured by higher layer signaling. In such a case, the SRS request field is 1 bit field for DCI formats 0/1A/2B/2C, wherein a type 1 SRS may be triggered if the value of the SRS request field is set to 1. Furthermore, a 1-bit SRS request field may be included in DCI formats 0/1A for frame structure type 1 and 0/1A/2B/2C for frame structure type 2, if the UE is configured with SRS parameters for DCI formats 0/1A/2B/2C by higher-layer signaling.

TABLE 9

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

According to the above exemplary embodiment, each of the 5 configuration parameter sets, srs-ConfigApDCI-Format0, srs-ConfigApDCI-Format1a2b2c, and 3 sets of srs-ConfigApDCI-Format4, may now additionally include fields for the additional IEs that are jointly indicating the SRS base sequence and the value of m.

According to the legacy LTE specification, IEs for legacy aperiodic SRS, which are a SoundingRS-UL-ConfigDedicatedAperiodic-r10 IE and a SRS-ConfigAp-r10 IE, are shown in Table 10, below.

TABLE 10

```
SoundingRS-UL-ConfigDedicatedAperiodic-r10 : := CHOICE {
    release                         NULL,
    setup                           SEQUENCE {
        srs-ConfigIndexAp-r10           INTEGER {0 .. 31)
        srs-ConfigApDCI-Format4-r10     SEQUENCE (SIZE (1 .. 3)) OF SRS-ConfigAg-r10 OPTIONAL, --Need ON
        srs-ActivateAp-r10              CHOICE {
            release                         NULL,
            setup                           SEQUENCE {
                srs-ConfigApDCI-Format0-r10         SRS-ConfigAp-r10,
                srs-ConfigApDCI-Format1a2b2c-r10    SRS-ConfigAp-r10,
                ...
            }
        }                                                           Optional --Need ON
    }
}
SRS-ConfigAp-r10 : := SEQUENCE {
    srs-Antenna-portAp-r10          SRS-AntennaPort,
    srs-BandwidthAp-r10             ENUMERATED (bw0, bw1, bw2, bw3),
    freqDomainPositionAp-r10        INTEGER (0 .. 23),
    transmissionCombAp-r10          INTEGER (0 .. 1)
    cyclicShiftAp-r10               ENUMERATED (cs0, cs1, cs2, cs3, cs4, cs5, cs6, cs7)
}
```

According to the present exemplary embodiment, with respect to trigger aperiodic SRS, the RRC IEs, as shown in Table 10, may be modified to be as shown in Table 11. As shown in Table 10, a parameter srs-virtualCellID-r11 indicates a virtual cell ID to be used for SRS sequence generation, and a parameter srs-pOffsetIndex-r11 indicates a SRS power offset index, i.e., m.

Figure 8:
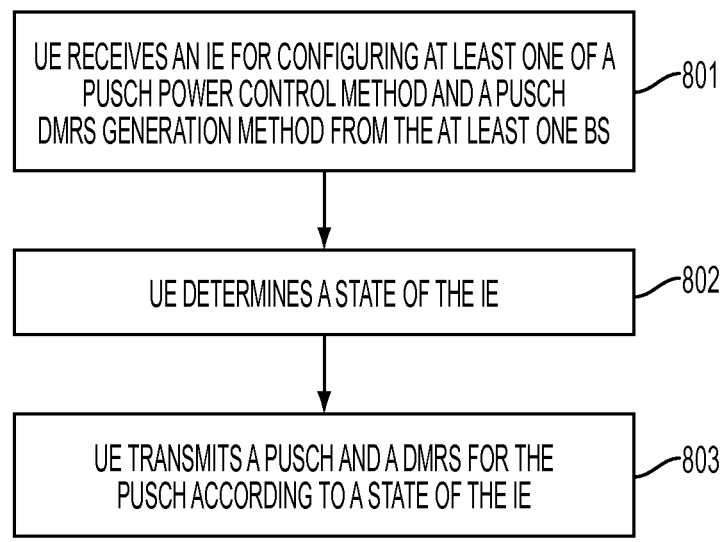
FIG. 8 illustrates a method of a User Equipment (UE) in a wireless network including at least one Base Station (BS) according to an exemplary embodiment of the present invention.

Referring to FIG. 8, a UE receives an IE for configuring at least one of a PUSCH power control method and a PUSCH DMRS generation method from the at least one BS in step 801. Next, in step 802, the UE determines a state of the IE. Then, the UE transmits a PUSCH and a DMRS for the PUSCH according to a state of the IE in step 803. As discussed above, a transmission power of the PUSCH transmis-

TABLE 11

```
SoundingRS-UL-ConfigDedicatedAperiodic-r11 ::= CHOICE {
   release                    NULL,
   setup                      SEQUENCE {
     srs-ConfigIndexAp-r11         INTEGER (0 .. 31)
     srs-ConfigApDCI-Format4-r11   SEQUENCE (SIZE (1 .. 3)) OF SRS-ConfigAp-r11 OPTIONAL, --Need
                                   ON
     srs-ActivateAp-r11            CHOICE {
       release                     NULL,
       setup                       SEQUENCE {
         srs-ConfigApDCI-Format0-r11     SRS-ConfigAp-r11,
         srs-ConfigApDCI-Format1a2b2c-r11  SRS-ConfigAp-r11,
         ...
       }
     }                             OPTIONAL -- NEED ON
   }
}
SRS_ConfigAp-r11 ::= SEQUENCE {
   srs-AntennaPortAp-r11      SRS-AntennaPort,
   srsBandwidthAp-r11         ENUMERATED (bw0, bw1, bw2, bw3),
   freqDomainPositionAp-r11   INTEGER (0 .. 23),
   transmissionCombAp-r11     INTEGER (0 .. 1),
   cyclicShiftAp-r11          ENUMERATED (cs0, cs1, cs2, cs3, cs4, cs5, cs6, cs7)
   srs-virtualCellID-r11      INTEGER (0 .. 503),
   srs-pOffsetIndex-r11       INTEGER (1 .. 2),
}
```

According to another exemplary embodiment of the present invention, and in contrast to the exemplary embodiment of Table 11, a power offset value for the aperiodic SRS (m=1) may be configured by the RRC layer so as to be UE-specific for each of the five parameter sets, instead of the m value. In such a case, pSRS-OffsetAp-r11 is included in SRS-ConfigAp-r11 instead of srs-pOffsetIndex-r11, and pSRS-OffsetAp-r11 has a value format of INTEGER(0 . . . 15). Accordingly, the value of SRS power offset $P_{SRS\_OFFSET,c}(1)$ and a base sequence generation method, or a VCID, for the aperiodic SRS are indicated by the SRS triggering bits and the triggering DCI format.

According to another exemplary embodiment, an index of a virtual cell ID used for the aperiodic SRS may be configured by the RRC layer so as to be UE-specific for each of the five parameter sets, instead of the VCID itself, as described above. In such a case, a Macro-eNB may configure two VCIDs that may be used for SRS, such as VCID($i_{VCID}$), $i_{VCID}$=1, 2. Accordingly, SRS-ConfigAp-r11 includes a field srs-virtualCellIDIndex-r11 instead of srs-virtualCellID-r11 and srs-virtualCellIDIndex-r11 has a value format of INTEGER(1, . . . 2). Accordingly, a base sequence generation method, or a virtual cell ID, for the aperiodic SRS and for an SRS power offset parameter are indicated by the SRS triggering bits and the triggering DCI format. The two VCIDs for SRS may be a physical cell ID and a VCID configured to PUCCH, and alternatively, at least one of the two VCIDs for SRS are explicitly configured, separately from other VCIDs. Accordingly, the above described exemplary embodiments provide CoMP transmission and reception for uplink transmissions in a wireless communication system.

FIG. 8 illustrates a method of a UE in a wireless network including at least one BS according to an exemplary embodiment.

sion may be controlled according to the state of the IE. More specifically, when the state of the IE indicates a first state, then the transmission power of the PUSCH transmission may be determined according to a first power control equation. On the other hand, when the state of the IE indicates a second state, then the transmission power of the PUSCH transmission may be determined according to a second power control equation. Furthermore, the base sequence for the PUSCH DMRS is also generated according to the state of the IE.

Figure 9:
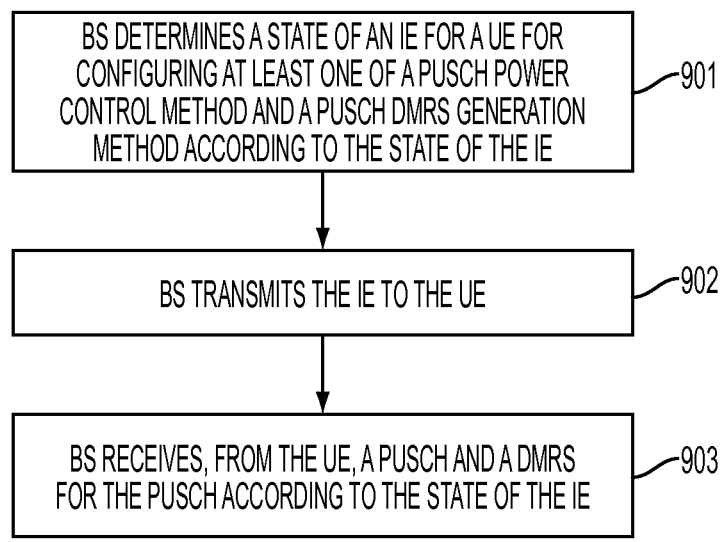
FIG. 9 method of a BS in a wireless network including at least one UE according to an exemplary embodiment of the present invention.

FIG. 9 method of a BS in a wireless network including at least one UE according to an exemplary embodiment.

Referring to FIG. 9, the BS may determine a state of an IE for a UE for configuring at least one of a PUSCH power control method and a PUSCH DMRS generation method according to the state of the IE in step 901. Next, in step 902, the BS may transmit the IE to the UE. Then, in step 903, the BS may receive, from the UE, a PUSCH and a DMRS for the PUSCH according to the state of the IE. As discussed above, a transmission power of the received PUSCH is controlled according to the state of the IE. Furthermore, when the state of the IE indicates a first state, then the transmission power of the received PUSCH is determined according to a first power control equation, and when the state of the IE indicates a second state, then the transmission power of the received PUSCH is determined according to a second power control equation. Additionally, a base sequence for the received PUSCH DMRS is generated according to the state of the IE.

Figure 10:
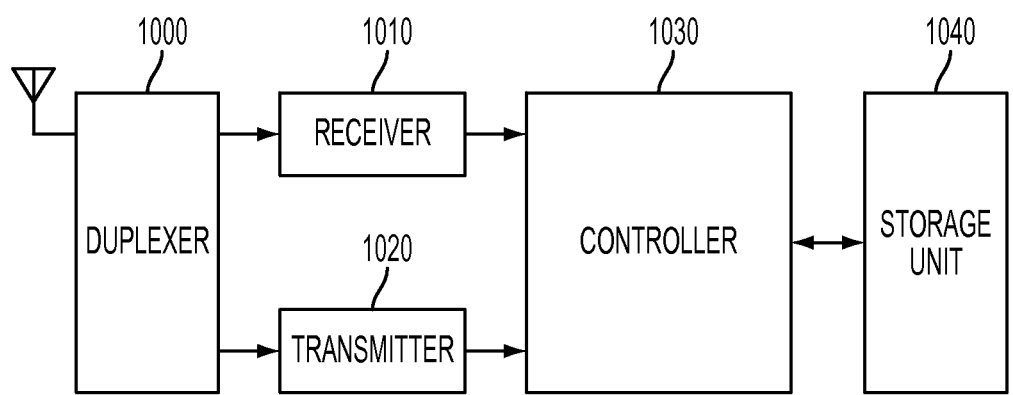
FIG. 10 is a block diagram illustrating a receiver in a wireless communication system according to an exemplary embodiment of the present invention.

FIG. 10 is a block diagram illustrating a receiver in a wireless communication system according to an exemplary embodiment of the present invention.

Referring to FIG. 10, the receiver includes a duplexer 1000, a receiver 1010, a transmitter 1020, a controller 1030, and a storage unit 1040. The receiver may include any number of additional structural elements. However, a description of additional structural elements of the receiver is omitted for conciseness. The receiver may be a UE, a mobile station, an AMS, etc.

The duplexer 1000 transmits a transmission signal provided from the transmitter 1020 via an antenna, and provides a reception signal from the antenna to the receiver 1010 according to a duplexing scheme.

The receiver 1010 processes the reception signal and converts the reception signal into a baseband signal, and provides the baseband signal to the controller 1030. For example, when the wireless communication system uses an OFDM scheme, the receiver 1010 includes a Radio Frequency (RF) processor, an Analog/Digital Converter (ADC), an Orthogonal Frequency Division Multiplexing (OFDM) demodulator, and a decoder. Accordingly, the RF processor converts an RF signal provided from the duplexer 1000 into a baseband analog signal. The ADC converts the analog signal provided from the RF processor into digital sample data. The OFDM demodulator transforms sample data in a time domain provided from the ADC into data in a frequency domain by performing a Fast Fourier Transform (FFT). The decoder demodulates and decodes a signal provided from the OFDM demodulator according to a Modulation and Coding Scheme (MCS) level.

The controller 1030 controls overall operations of the receiver. The operations of receiver include any of the operations explicitly or implicitly described above as being performed by a receiver, a mobile station, a UE, or AMS.

The transmitter 1020 converts a transmission signal into an RF signal, processes the RF signal, and provides the processed RF signal to the duplexer 1000 under control of the controller 1030. For example, when the wireless communication system uses an OFDM scheme, the transmitter 1020 includes an encoder, an OFDM modulator, a Digital/Analog Converter (DAC) and an RF processor. The encoder encodes and modulates a transmission signal according to an MCS level under control of the controller 1030. The OFDM modulator converts data in the frequency domain provided from the encoder into sample data (i.e., an OFDM symbol) in a time domain by performing an Inverse FFT (IFFT). The DAC converts sample data provided from the OFDM modulator into an analog signal. The RF processor converts a baseband analog signal provided from the DAC into an RF signal.

The storage unit 1040 stores programs required for overall operations of the receiver and various data, including any of the information and/or the algorithms discussed herein as being received, transmitted, retained or used by a receiver, UE, mobile station, or AMS.

Figure 11:
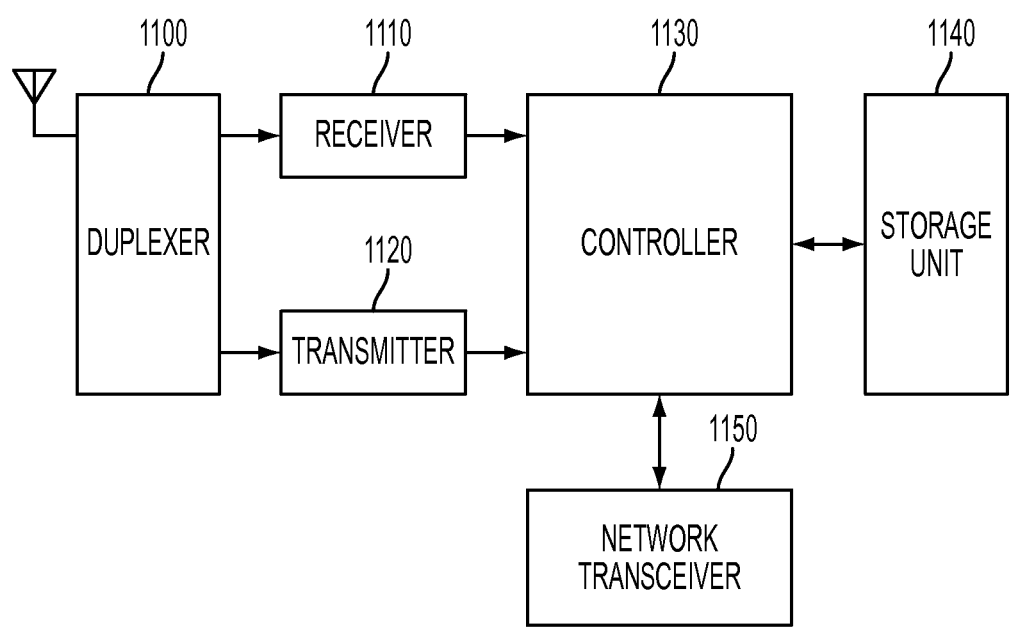
FIG. 11 is a block diagram illustrating a transmitter in a wireless communication system according to an exemplary embodiment of the present invention.

FIG. 11 is a block diagram illustrating a transmitter in a wireless communication system according to an exemplary embodiment of the present invention.

Referring to FIG. 11, the transmitter includes a duplexer 1100, a receiver 1110, a transmitter 1120, a controller 1130, a storage unit 1140, and a network transceiver 1150. The transmitter may include any number of additional structural elements. However, a description of additional structural elements of transmitter is omitted for conciseness. The transmitter may be a base station, eNB, RRH, a micro-eNB, ABS, etc.

The duplexer 1100 transmits a transmission signal provided from the transmitter 1120 via an antenna, and provides a reception signal from the antenna to the receiver 1110 according to a duplexing scheme.

The receiver 1110 receives the reception signal and converts the reception signal into a baseband signal and provides the baseband signal to the controller 1130. For example, when the wireless communication system uses an OFDM scheme, the receiver 1110 includes an RF processor, an ADC, an OFDM demodulator and a decoder. The RF processor converts an RF signal provided from the duplexer 1100 into a baseband analog signal. The ADC converts the analog signal provided from the RF processor into digital sample data. The OFDM demodulator converts sample data in the time domain provided from the ADC into data in the frequency domain by performing FFT. The decoder demodulates and decodes a signal provided from the OFDM demodulator according to an MCS level.

The controller 1130 controls overall operations of the transmitter. The operations of the transmitter include any of the operations explicitly or implicitly described above as being performed by a transmitter, a base station, an eNB, a micro-eNB, an RRH, an ABS, or the like.

The transmitter 1120 converts a transmission signal into an RF signal, processes the RF signal, and provides the processed RF signal to the duplexer 1100 under control of the controller 1130. For example, when the wireless communication system uses an OFDM scheme, the transmitter 1120 includes an encoder, an OFDM modulator, a Digital/Analog Converter (DAC) and an RF processor. The encoder encodes and modulates a transmission signal according to an MCS level under control of the controller 1130. The OFDM modulator converts data in the frequency domain provided from the encoder to sample data (i.e., an OFDM symbol) in the time domain by performing IFFT. The DAC converts sample data provided from the OFDM modulator into an analog signal. The RF processor converts a baseband analog signal provided from the DAC into an RF signal.

The storage unit 1140 stores programs required for overall operations of the transmitter and various data including any of the information and/or algorithms discussed herein as being received, transmitted, retained or used by an transmitter, a base station, an eNB, a micro-eNB, an RRH, an ABS, or the like.

The network transceiver 1150 facilities communication with other network entities within a wireless communication system.

Certain aspects of the present invention may also be embodied as computer readable code on a computer readable recording medium. A computer readable recording medium is any data storage device that can store data, which can be thereafter read by a computer system. Examples of the computer readable recording medium include Read-Only Memory (ROM), Random-Access Memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion. Also, functional programs, code, and code segments for accomplishing the present invention can be easily construed by programmers skilled in the art to which the present invention pertains.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of a User Equipment (UE) in a wireless network including at least one Base Station (BS), the method comprising:
receiving an Information Element (IE) for configuring at least one of a Physical Uplink Shared Channel (PUSCH)

power control method and a PUSCH Demodulation Reference Signal (DMRS) generation method from the at least one BS;

determining a state of the IE; and transmitting a PUSCH and a DMRS for the PUSCH according to the state of the IE, wherein a transmission power of the PUSCH is controlled according to the state of the IE, wherein, when the state of the IE indicates a first state, then the transmission power of the PUSCH is determined according to a first power control equation, wherein, when the state of the IE indicates a second state, then the transmission power of the PUSCH is determined according to a second power control equation, and wherein a base sequence for the PUSCH DMRS is generated according to the state of the IE.

2. The method of claim 1, wherein, when the state of the IE indicates the first state, then the base sequence is generated according to a physical cell Identifier (ID) assigned for a cell corresponding to the at least one BS, and wherein, when the state information of the IE indicates the second state, the base sequence is generated according to a virtual cell ID.

3. The method of claim 1, wherein, when the state of the IE indicates the first state, then the base sequence is generated according to a first virtual cell Identifier (ID), and wherein, when the state information of the IE indicates the second state, the base sequence is generated according to a second virtual cell ID.

4. The method of claim 1, wherein, the first power control equation is a function of a path-loss measurement based upon Cell-specific Reference Signals (RSs) (CRSs), and wherein the second power control equation is a function of a path-loss measurement based upon Channel State Information (CSI)-RSs that are configured according to a CSI-RS configuration.

5. The method of claim 1, wherein, the first power control equation is a function of a path-loss measurement based upon Channel State Information (CSI)-Reference Signals (RSs) that are configured according to a first CSI-RS configuration, and wherein the second power control equation is a function of a path-loss measurement based upon CSI-RSs that are configured according to a second CSI-RS configuration.

6. The method of claim 1, wherein the IE is transmitted in a Radio Resource Control (RRC) layer of the wireless network.

7. The method of claim 1, wherein the IE is an at least one-bit field included in at least one of a Downlink Control Information (DCI) format 0 message and a DCI format 4 message.

8. A User Equipment (UE) apparatus for communicating in a wireless network including at least one Base Station (BS), the apparatus comprising:

a transceiver for receiving an Information Element (IE) for configuring at least one of a Physical Uplink Shared Channel (PUSCH) power control method and a PUSCH Demodulation Reference Signal (DMRS) generation method from the at least one BS, and for transmitting a PUSCH and a DMRS for the PUSCH according to a state of the IE; and a controller for determining the state of the IE, for determining a transmission power of the PUSCH according to the state of the IE, and for generating a base sequence for the PUSCH DMRS according to the state of the IE, wherein, when the state of the IE indicates a first state, then the controller determines the transmission power of the PUSCH according to a first power control equation, and wherein, when the state of the IE indicates a second state, then the controller determines the transmission power of the PUSCH according to a second power control equation.

9. The apparatus of claim 8, wherein, when the state of the IE indicates the first state, then the controller generates the base sequence according to a physical cell Identifier (ID) assigned for a cell corresponding to the at least one BS, and wherein, when the state information of the IE indicates the second state, the controller generates the base sequence according to a virtual cell ID.

10. The apparatus of claim 8, wherein, when the state of the IE indicates the first state, then the controller generates the base sequence according to a first virtual cell Identifier (ID), and wherein, when the state information of the IE indicates the second state, then the controller generates the base sequence according to a second virtual cell ID.

11. The apparatus of claim 8, wherein, the first power control equation is a function of a path-loss measurement based upon Cell-specific Reference Signals (RSs) (CRSs), and wherein the second power control equation is a function of a path-loss measurement based upon Channel State Information (CSI)-RSs that are configured according to a CSI-RS configuration.

12. The apparatus of claim 8, wherein, the first power control equation is a function of a path-loss measurement based upon Channel State Information (CSI)-Reference Signals (RSs) that are configured according to a first CSI-RS configuration, and wherein the second power control equation is a function of a path-loss measurement based upon CSI-RSs that are configured according to a second CSI-RS configuration.

13. The apparatus of claim 8, wherein the transceiver receives the IE in a Radio Resource Control (RRC) layer of the wireless network.

14. The apparatus of claim 8, wherein the transceiver receives the IE as an at least a one-bit field included in at least one of a Downlink Control Information (DCI) format 0 message and a DCI format 4 message.

15. A Base Station (BS) apparatus for communicating in a wireless network including at least one User Equipment (UE), the apparatus comprising:

a controller for determining a state of an Information Element (IE) for configuring at least one of a Physical Uplink Shared Channel (PUSCH) power control method and a PUSCH Demodulation Reference Signal (DMRS) generation method of the at least one UE; and a transceiver for transmitting the IE to the at least one UE, for receiving a PUSCH and a DMRS for the PUSCH according to the state of the IE from the at least one UE, and for receiving a base sequence for the PUSCH DMRS according to the state of the IE, wherein, when the state of the IE indicates a first state, then the transceiver receives the transmission power of the PUSCH according to a first power control equation, and wherein, when the state of the IE indicates a second state, then the transceiver receives the transmission power of the PUSCH according to a second power control equation.

16. The apparatus of claim 15, wherein when the controller determines the IE to have the first state, then the base sequence is generated according to a physical cell Identifier (ID) assigned for a cell corresponding to the BS, and wherein, the controller determines the IE to have the second state, then the base sequence is generated according to a virtual cell ID.

17. The apparatus of claim 15, wherein when the controller determines the IE to have the first state, then the base sequence is generated according to a first virtual cell Identifier (ID), and wherein, when the controller determines the IE to have the second state, then the base sequence is generated according to a second virtual cell ID.

18. The apparatus of claim 15, wherein, the first power control equation is a function of a path-loss measurement based upon Cell-specific Reference Signals (RSs) (CRSs), and wherein the second power control equation is a function of a path-loss measurement based upon Channel State Information (CSI)-RSs that are configured according to a CSI-RS configuration.

19. The apparatus of claim 15, wherein, the first power control equation is a function of a path-loss measurement based upon Channel State Information (CSI)-Reference Signals (RSs) that are configured according to a first CSI-RS configuration, and wherein the second power control equation is a function of a path-loss measurement based upon CSI-RSs that are configured according to a second CSI-RS configuration.

20. The apparatus of claim 15, wherein the transceiver transmits the IE in a Radio Resource Control (RRC) layer of the wireless network.

21. The apparatus of claim 15, wherein the transceiver transmits the IE as an at least a one-bit field included in at least one of a Downlink (DL) Control Information (DCI) format 0 message and a DCI format 4 message.

* * * * *